(12) United States Patent
Sasaoka et al.

(10) Patent No.: US 11,620,937 B2
(45) Date of Patent: Apr. 4, 2023

(54) LIGHT SOURCE DEVICE AND LIGHT EMISSION CONTROL METHOD

(71) Applicant: SAMSUNG ELECTRONICS CO., LTD., Suwon-si (KR)

(72) Inventors: Takayuki Sasaoka, Yokohama (JP); Osamu Konuma, Yokohama (JP); Katsutoshi Sasaki, Yokohama (JP); Taehong Min, Seoul (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 16 days.

(21) Appl. No.: 17/373,376

(22) Filed: Jul. 12, 2021

(65) Prior Publication Data

US 2022/0020318 A1    Jan. 20, 2022

(30) Foreign Application Priority Data

Jul. 14, 2020  (JP) .............................. JP2020-120289
Dec. 18, 2020  (KR) ......................... 10-2020-0178675

(51) Int. Cl.
*G09G 3/32* (2016.01)
*G09G 3/34* (2006.01)
*H05B 45/325* (2020.01)
*H05B 45/12* (2020.01)
*H05B 45/18* (2020.01)
(Continued)

(52) U.S. Cl.
CPC ......... *G09G 3/32* (2013.01); *G02F 1/133603* (2013.01); *G02F 1/133612* (2021.01); *G09G 3/342* (2013.01); *H05B 45/12* (2020.01); *H05B 45/18* (2020.01); *H05B 45/325* (2020.01); *G02F 1/133611* (2013.01); *G09G 2320/041* (2013.01); *G09G 2320/064* (2013.01); *G09G 2360/141* (2013.01); *G09G 2360/145* (2013.01)

(58) Field of Classification Search
CPC .... G09G 3/32; G09G 3/342; G09G 2320/041; G09G 2320/064; G09G 2360/141; G09G 2360/145; H05B 45/18; H05B 45/325; H05B 45/12; G02F 1/133612; G02F 1/133603; G02F 1/133611
USPC ........................................................ 345/207
See application file for complete search history.

(56) References Cited

U.S. PATENT DOCUMENTS

2004/0046720 A1 *  3/2004  Nagai ..................... G09G 3/32
                                                       345/82
2008/0238860 A1 * 10/2008  Onodera .............. G09G 3/3426
                                                       345/102
(Continued)

FOREIGN PATENT DOCUMENTS

JP    2008-268642 A    11/2008
JP    2009-99701 A      5/2009
(Continued)

*Primary Examiner* — Amare Mengistu
*Assistant Examiner* — Gloryvid Figueroa-Gibson
(74) *Attorney, Agent, or Firm* — Sughrue Mion, PLLC

(57) ABSTRACT

Provided are a light source device, a light emission control method, and a computer program for mitigating flickers. The light source device includes a plurality of light sources, and a controller configured to individually control the plurality of light sources to emit light. The controller controls one or more of the plurality of light sources to emit light at random in a time domain or controls such that light emission timings of the plurality of light sources do not overlap.

14 Claims, 22 Drawing Sheets

(51) Int. Cl.
  *G02F 1/1335*     (2006.01)
  *G02F 1/13357*    (2006.01)

(56) References Cited

U.S. PATENT DOCUMENTS

| | | | |
|---|---|---|---|
| 2010/0045895 A1* | 2/2010 | Komiya | H05B 45/397 |
| | | | 323/318 |
| 2011/0018973 A1* | 1/2011 | Takayama | H04N 5/232121 |
| | | | 348/47 |
| 2011/0157244 A1* | 6/2011 | Nakano | G09G 3/3413 |
| | | | 345/690 |
| 2011/0304599 A1 | 12/2011 | Yasui | |
| 2012/0313984 A1* | 12/2012 | Mihara | G09G 3/342 |
| | | | 345/690 |
| 2014/0063359 A1 | 3/2014 | Chen | |
| 2014/0218272 A1* | 8/2014 | Kikuchi | G09G 3/3266 |
| | | | 345/77 |
| 2016/0299341 A1 | 10/2016 | Yoshida et al. | |
| 2017/0068295 A1* | 3/2017 | Yang | G06F 1/26 |
| 2019/0361237 A1 | 11/2019 | Brandt et al. | |
| 2020/0374494 A1* | 11/2020 | Yamamoto | H04N 9/3123 |

FOREIGN PATENT DOCUMENTS

| | | |
|---|---|---|
| JP | 5109983 B2 | 12/2012 |
| JP | 5222165 B2 | 6/2013 |
| JP | 2015-34877 A | 2/2015 |
| JP | 2017-105291 A | 6/2017 |
| KR | 10-1224849 B1 | 2/2013 |
| KR | 10-2015-0079007 A | 7/2015 |

\* cited by examiner

LIGHT SOURCE DEVICE AND LIGHT EMISSION CONTROL METHOD

CROSS-REFERENCE TO RELATED APPLICATION

This application claims priority from Japanese Patent Application No. 2020-120289, filed on Jul. 14, 2020, in the Japan Patent Office, and Korean Patent Application No. 10-2020-0178675, filed on Dec. 18, 2020, in the Korean Intellectual Property Office, the disclosures of which are herein incorporated by reference in their entireties.

BACKGROUND

1. Field

Methods and apparatuses consistent with example embodiments relate to a light source device and a light emission control method.

2. Description of Related Art

In the field of displays, it is required to display finer images by appropriately controlling the light emission (for example, luminance) of a display.

For example, a technique for correcting the luminance of a light-emitting element in a light-emitting diode (LED) by measuring the luminance of blocks requiring luminance correction is disclosed in Japanese Patent Application Publication No. 2008-268642. Japanese Patent Application Publication No. 2008-268642 discloses a method in which, in a case of correcting a block luminance in an area, the LED receives light through a light-receiving element in a state in which only blocks requiring luminance correction are turned on within the area and all the other blocks in the area are turned off.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a light-emitting diode (LED) display device, including: a plurality of LED elements; and at least one controller configured to control the plurality of LED elements, wherein the at least one controller is configured to control at least one of the plurality of LED elements to emit light at random in a time domain, or configured to control the plurality of LED elements such that light emission timings of the plurality of LED elements do not overlap.

The at least one controller may be further configured to perform control to mask a portion of driving pulses of at least one LED element of the plurality of LED elements.

The at least one controller may be further configured to, based on at least one LED element being controlled to emit light in a light emission amount that is less than a first threshold, control a light emission of the at least one LED element by changing, with respect to the at least one LED element, a number of driving pulses that are output within a predetermined time.

The at least one controller may be further configured to, based on at least one LED element being controlled to emit light in a light emission amount that is less than a first threshold, control to mask a portion of driving pulses of the at least one LED element.

The at least one controller may be further configured to, based on at least one LED element being controlled to emit light in a light emission amount that is greater than or equal to a second threshold, control a light emission of the at least one LED element by changing a value of a current flowing in the at least one LED element.

The at least one controller may be further configured to, based on at least one LED element being controlled to emit light in a light emission amount that is greater than or equal to a first threshold and less than a second threshold, control a light emission of the at least one LED element by pulse width modulation (PWM).

The LED display device may further include: a plurality of light detectors, wherein each of the plurality of light detectors is configured to detect a light emission of a corresponding one of the plurality of LED elements, and wherein the at least one controller is further configured to obtain, in a first period of time, a relationship between a driving pulse and a luminance value of an LED element based on a result of detection of a corresponding light detector of the plurality of light detectors, and control, in a second period of time, the LED element based on the obtained relationship.

According to an aspect of an example embodiment, there is provided a light source device, including: a plurality of light sources; and at least one controller configured to control the plurality of light sources, wherein the at least one controller is configured to control at least one of the plurality of light sources to emit light at random in a time domain, or to control the plurality of light sources such that light emission timings of the plurality of light sources do not overlap.

The at least one controller may be further configured to control to mask a portion of driving pulses of at least one light source of the plurality of light sources.

The at least one controller may be further configured to mask the portion of the driving pulses, based on the at least one light source being controlled to emit light in a light emission amount that is less than or equal to a threshold.

The at least one controller may be further configured to control to mask the portion of the driving pulses, based on a determination that it is impossible to reduce a pulse width of the driving pulses by pulse width modulation (PWM).

The at least one controller may be further configured to select, at random, the portion of the driving pulses, and to control to mask the selected portion of the driving pulses.

The at least one controller may be further configured to generate the driving pulses of the at least one light source to have a random pulse interval in the time domain.

The at least one controller may be further configured to generate the driving pulses of the at least one light source to have a substantially uniform pulse interval in the time domain.

The light source device may further include: a plurality of light detectors, wherein each of the plurality of light detectors is configured to detect a light emission of a corresponding one of the plurality of light sources, and wherein the at least one controller is further configured to control a first light source based on a result of detection of a corresponding light detector of the plurality of light detectors.

The at least one controller may be further configured to determine a luminance value of the first light source based on a light emission peak value of the first light source detected by the corresponding light detector, a distance between the corresponding light detector and the first light source, and a light emission time of the first light source.

The at least one controller may be further configured to adjust the luminance value of the first light source by controlling the first light source based on the determined luminance value.

The corresponding light detector of the first light source may include a first light detector and a second light detector, wherein a distance between the first light detector and the first light source and a distance between the second light detector and the first light source are substantially the same, and wherein the at least one controller is further configured to calibrate a sensitivity difference between the first light detector and the second light detector based on a result of detecting a light emission of the first light source by the first light detector and a result of detecting the light emission of the first light source by the second light detector.

The light source device may further include: a temperature sensor configured to measure a temperature with respect to the first light source, wherein the at least one controller is further configured to correct the result of detection of the corresponding light detector based on the temperature measured by the temperature sensor.

The plurality of light sources may include a first light source and a second light source, and the at least one controller may be further configured to control a light emission timing of the second light source to be delayed by a first time behind a light emission timing of the first light source, the first time being greater than a light emission time of the first light source.

According to an aspect of an example embodiment, there is provided a light source device, including a plurality of light sources, and a controller configured to individually control the plurality of light sources to emit light. The controller may be configured to control at least one of the plurality of light sources to emit light at random over time.

According to an aspect of an example embodiment, there is provided a light emission control method including controlling one or more of a plurality of light sources to emit light at random in a time domain, or controlling the plurality of light sources such that the light emission timings of the plurality of light sources do not overlap.

According to an aspect of an example embodiment, there is provided a computer program stored in a non-transitory computer-readable storage medium, the computer program being configured to control a processor to perform a light emission control method. The light emission control method may include controlling one or more of a plurality of light sources to emit light at random in a time domain, or controlling the plurality of light sources such that the light emission timings of the plurality of light sources do not overlap.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
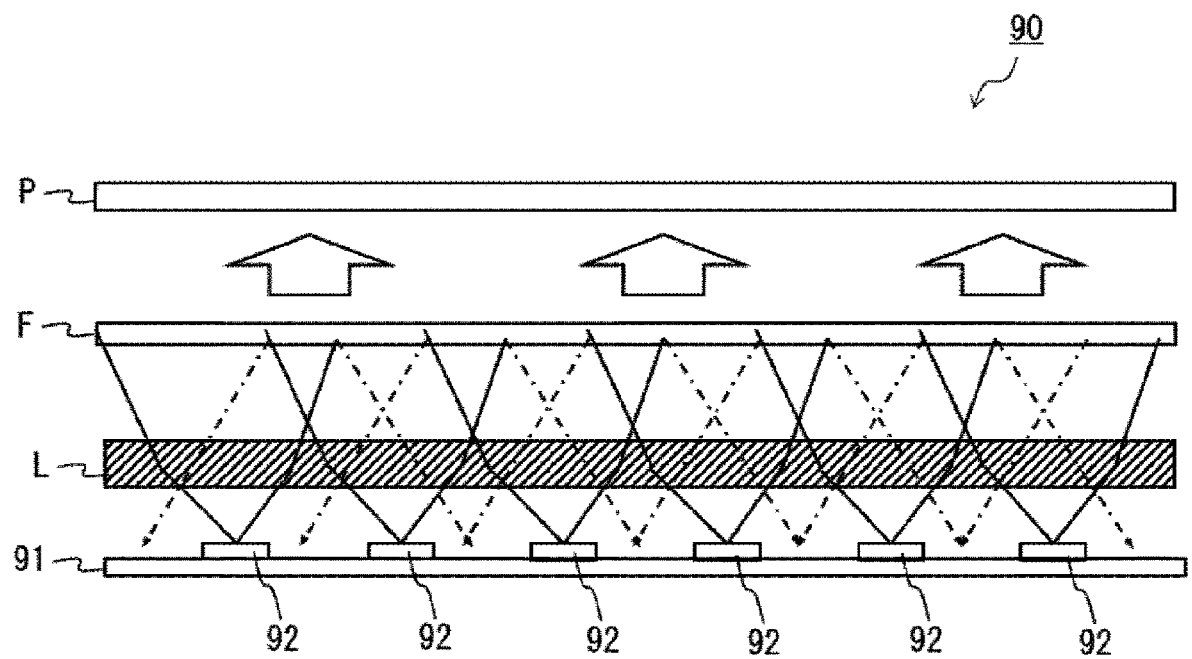
FIG. 1 is a cross-sectional view illustrating a light-emitting diode (LED) display device according to an example embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a cross-sectional view illustrating a light-emitting diode (LED) display device 90 according to an example embodiment. Referring to FIG. 1, the LED display device 90 includes an LED substrate 91, a lens L, a brightness enhancement film F, and a liquid crystal panel P.

A plurality of LED elements 92 is provided on the LED substrate 91. The LED substrate 91 may function as a light source device. The plurality of LED elements 92 emits light. The emitted light is incident to the lens L and refracted to reach the brightness enhancement film F. The brightness enhancement film F allows only light polarized (coherent) in a predetermined direction, among the incident light, to proceed toward the liquid crystal panel P, and reflects and returns the other incident light toward the lens L. The brightness enhancement film F may be, for example, a dual brightness enhancement film (DBEF).

The incident light returning to the lens L as reflected by the brightness enhancement film F sequentially reaches the lens L and the LED substrate 91, then is reflected by the LED substrate 91, and reaches the brightness enhancement film F again. In this case, the light polarized in the predetermined direction, among the incident light reaching the brightness enhancement film F again, is allowed to proceed toward the liquid crystal panel P, and the other light is reflected by the brightness enhancement film F and returns to the lens L. This mechanism allows light polarized in the predetermined direction to enter the liquid crystal panel P without loss. Viewing the liquid crystal panel P may allow a user to view an image provided by the LED display device 90.

Figure 2:
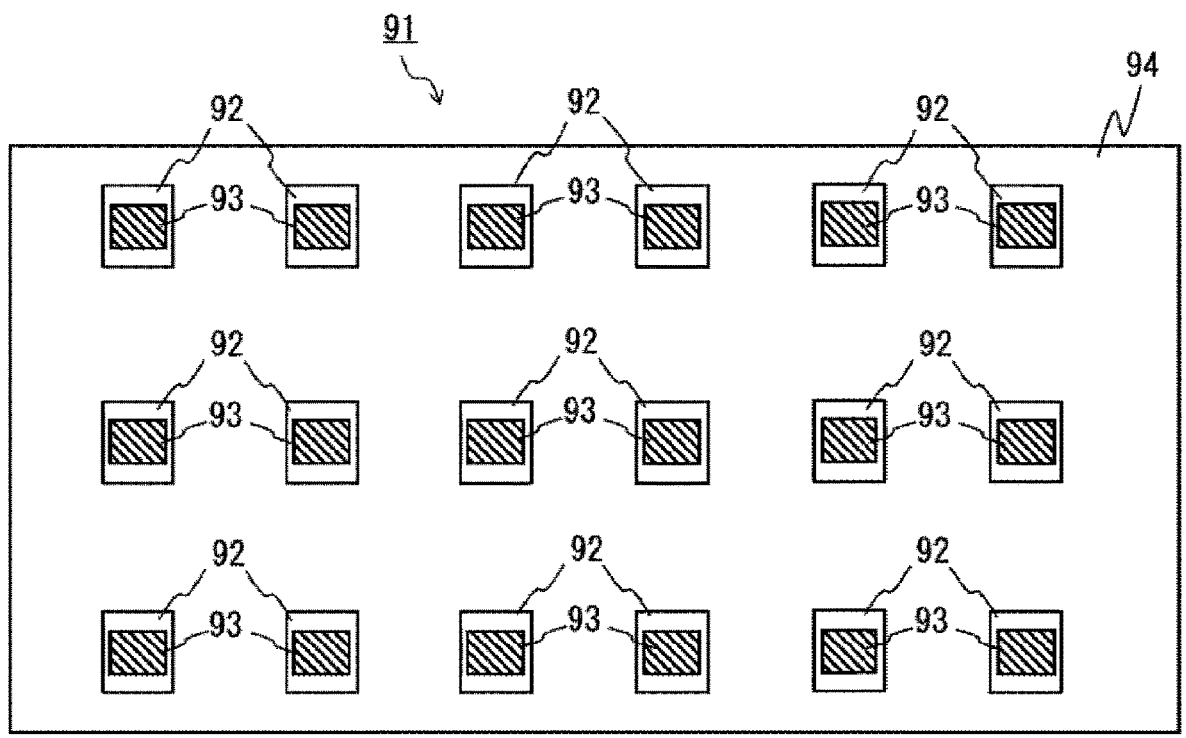
FIG. 2 illustrates an example of an LED substrate according to an example embodiment.

FIG. 2 illustrates an example of an LED substrate 91 according to an example embodiment. Referring to FIG. 2, the LED substrate 91 includes a substrate body 94 and the plurality of LED elements 92. Each of the plurality of LED elements 92 may include an LED chip 93. As shown in FIG. 2, the plurality of LED elements 92 are arranged in the form of a square lattice on the LED substrate 91. However, this is merely an example and does not limit the embodiments of the disclosure The light emission of the LED elements 92 is controlled by one or more controllers (not shown). For example, the one or more controllers may individually control the plurality of LED elements 92, respectively, by pulse width modulation (PWM). For example, the one or more controllers may perform control to increase the pulse width of driving pulses to be used for control of light emission such that the LED elements 92 emit light in a large light emission amount, and to decrease the pulse width of the driving pulses such that the LED elements 92 emit light in a small light emission amount.

Herein, the term "luminance" or "brightness" refers to a peak value or height of a light pulse emitted by a light source. The unit for "luminance" may be the nit. The term "light emission amount" refers to an amount of light emitted in a predetermined time for which a light pulse continues. The duration of the light pulse is the pulse width of the light pulse, and the luminance is the peak value of the light pulse. Thus, the "light emission amount" may be expressed by the product of the pulse width of the light pulse and the peak value of the light pulse. The term "duty ratio" is a ratio of a time for which a light pulse is ON to one period of the light pulse, and is also referred to as "ON duty ratio".

Figure 3:
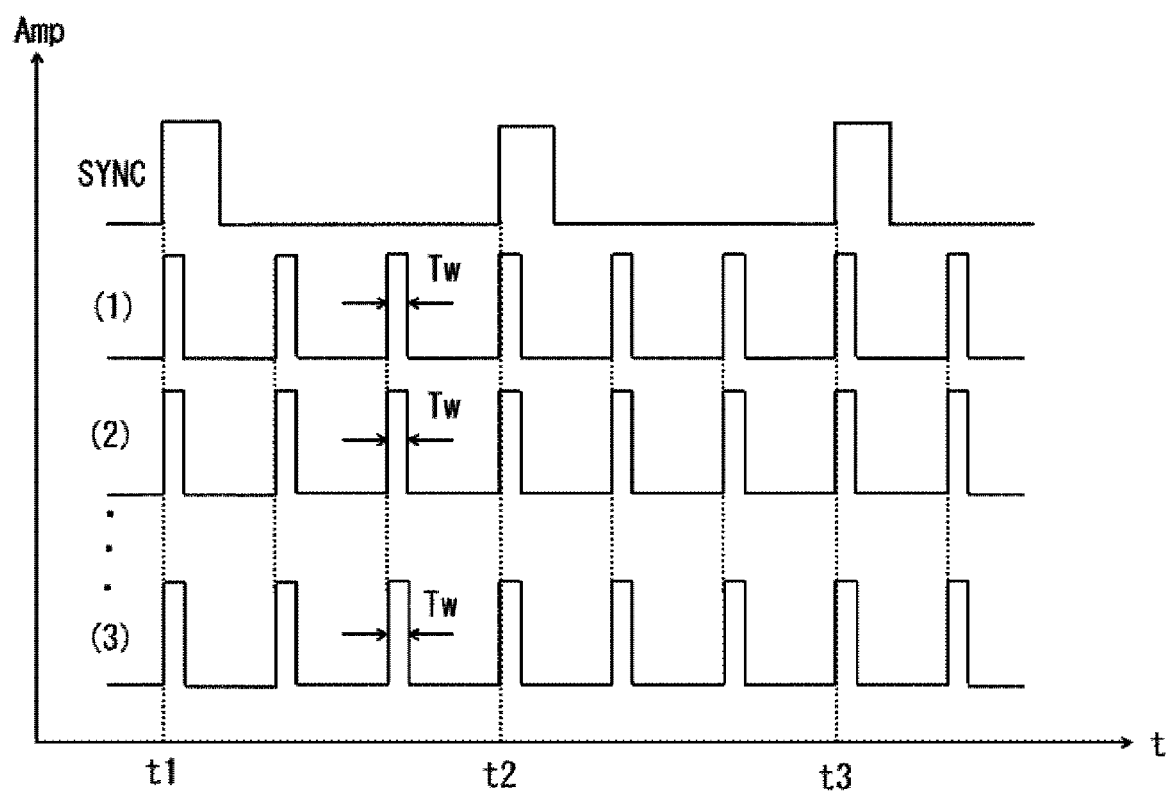
FIG. 3 illustrates examples of driving pulses of LED elements shown in FIG. 2 according to an example embodiment.

FIG. 3 illustrates examples of driving pulses of LED elements 92 shown in FIG. 2 according to an example embodiment. As shown in FIG. 3, driving signals (1), (2), and (3) to be used for control of light emission of the LED elements 92 each include a series of driving pulses. The driving pulses of the driving signals may be generated in association with synchronizing pulses of a synchronizing signal SYNC. In the example shown in FIG. 3, each of the plurality of driving signals (1) to (3) is associated with the synchronizing signal SYNC. The synchronizing signal SYNC periodically generates synchronizing pulses. In FIG. 3, the synchronizing signal SYNC generates synchronizing pulses at times t1, t2, and t3. Here, the time interval between t1 and t2 and the time interval of t2 and t3 are the same. The LED elements 92 emit light according to the received driving pulses.

Each of the plurality of driving signals (for example, the driving signal (1)) includes a series of driving pulses. In the example embodiment of FIG. 3, three driving pulses are generated for one synchronizing pulse. However, the example embodiments are not limited thereto. For example, only one driving pulse may be generated for one synchronizing pulse, or five or any number of driving pulses may be generated for one synchronizing pulse.

In the example embodiment of FIG. 3, the plurality of driving signals all generate driving pulses at the same timing. However, the example embodiments are not limited thereto. In the example embodiment of FIG. 3, the driving pulses of the plurality of driving signals all have the same pulse width Tw. However, the example embodiments are not limited thereto. For example, if the LED elements 92 of FIG. 2 are controlled by PWM, the pulse width Tw of the driving pulses may be variable. In the example embodiment of FIG. 3, the plurality of driving signals all have the same interval between the driving pulses, that is, the same pulse interval. However, the example embodiments are not limited thereto. For example, the driving signal (1) and the drive signal (2) may have different pulse intervals. In addition, the pulse interval may be variable (may not be the same) even in one driving signal.

A difference in quality deterioration between the LED elements 92 with a lapse of time causes a luminance difference between the LED elements 92. Therefore, the image uniformity of the LED display device 90 deteriorates. In the example shown in FIG. 3, all of the LED elements 92 have the same light emission timing. Thus, light-receiving elements may not individually detect respective luminance values of the individual LED elements 92. If it is impossible to respectively detect the luminance values of the LED elements 92, the luminance difference between the LED elements 92 may not be obtained. If it is impossible to obtain the luminance difference between the LED elements 92, the luminance difference between the LED elements 92 may not be adjusted, such that the uniformity of an image displayed on the LED display device 90 deteriorates. Further, since current is supplied to all of the LED elements 92 at the same timing, the current consumption shows a great change. Accordingly, there is a need for a power source circuit to handle this, which leads to an increase in the cost.

In addition, as the light emission amount of the LED elements 92 decreases, the pulse width of the driving pulses to be used for control of light emission of the LED elements 92 decreases, and the pulse interval of the driving pulses increases. Similarly, as the light emission amount of the LED elements 92 decreases, the light emission time width of the light pulses (the pulse width of the light pulses) decreases, and the pulse interval between the light pulses (the time from a light emission ON to the next light emission ON) increases. This ON-OFF of light emission is recognized as a flicker by the user. Particularly, if light emission is periodic, the user may more easily recognize flickers.

Further, the LED elements 92 generate heat while emitting light. Due to the generated heat, the luminance of the LED elements 92 changes, and a non-uniform luminance distribution may occur between the LED elements 92. Specifically, in low-luminance light emission, the light emission of the LED elements 92 is not stable, and thus a change in the luminance of the LED elements 92 according to the temperature is great. It is known that there is a limitation in mitigating this non-uniform luminance distribution by controlling the amount of current flowing in the LED elements 92.

Some example embodiments of the disclosure provide a technique for controlling light sources such as LED elements such that the user may not recognize flickers.

Figure 4:
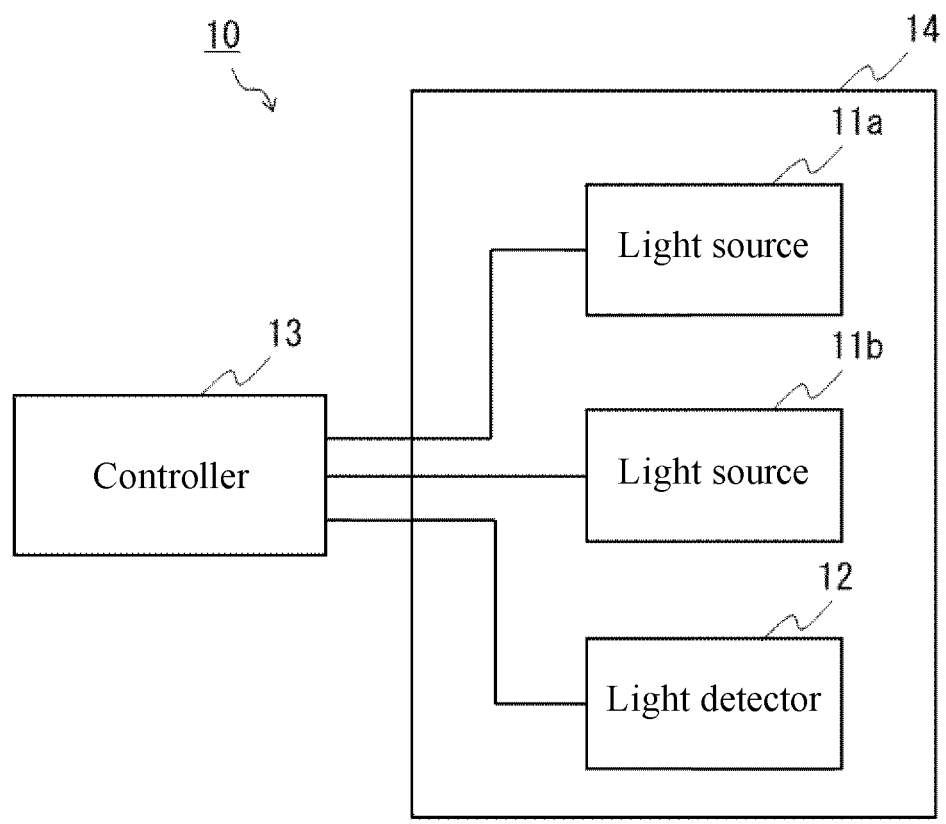
FIG. 4 is a block diagram illustrating a light source device according to an example embodiment.

FIG. 4 is a block diagram illustrating a light source device 10 according to an example embodiment. The LED display device 90 described above may be an example of the light source device 10. Referring to FIG. 4, the light source device 10 includes a plurality of light sources 11a and 11b, a light detector 12, and a controller 13. The light sources 11a and 11b and the light detector 12 are included in a light emission part 14.

The light source (first light source) 11a and the light source (second light source) 11b are elements that emit light. The light sources 11a and 11b may be light emission elements, such as, for example, LED elements. The light sources 11a and 11b may be controlled by the controller 13.

The light detector 12 is an element that detects light. The light detector may be a light-receiving element, such as, for example, a photodiode, a phototransistor, a photoresistor, or a light sensor. The light detector 12 may detect light emitted by the light sources 11a and 11b. Although FIG. 4 illustrates a single light detector 12, a plurality of light detectors may be provided in the light source device 10. Each of the plurality of light detectors detects the light emission of a corresponding one of the plurality of light sources 11a and 11b. A single light detector may detect light of a single corresponding light source or may detect light of the plurality of light sources. Light of a single light source may be detected by a single light detector or may be detected by a plurality of light detectors. The light detector provides detection results (for example, signals) corresponding to the detected light to the controller 13.

The controller 13 controls the corresponding light sources 11a and 11b based on the detection results (the signals) received from the light detector 12. The controller 13 generates control signals corresponding to the light sources 11a and 11b, respectively, based on the detection results received from the light detector 12. The control signals are output to the light sources 11a and 11b. In some example embodiments, the control signals may be driving signals for driving the light sources. The controller 13 individually controls the light sources 11a and 11b to individually emit light based on the control signals. For example, the controller 13 may change a light emission amount of a corresponding light source by changing at least one of the luminance (the height of the light pulse) of at least one of the light sources 11a and 11b, the width of the light pulses, or the interval between the light pulses (the duty ratio).

The controller 13 may include a driver (not shown). The driver generates driving signals and outputs the generated driving signals to the light sources 11a and 11b. The driving signals each include a series of driving pulses. The light sources 11a and 11b emit light based on the driving signals. The driver may be implemented to be physically separated from the controller 13.

The controller 13 may control at least one of the plurality of light sources 11a and 11b to emit light at random in a time domain. For example, the controller 13 may control the plurality of light sources 11a and 11b to emit light at random over time. Further, the controller 13 may control the plurality of light sources 11a and 11b such that the light emission timings of the plurality of light sources 11a and 11b do not overlap.

Here, "controlling a light source to emit light at random in a time domain" (hereinafter, simply referred to as "controlling a light source to emit light at random") may indicate light emission of a light source is performed nonperiodically. Here, "being performed nonperiodically" may indicate that there is an intentional time difference, which is not an error, between intervals of light emission within a predetermined time. In some example embodiments, controlling at least one of the plurality of light sources to emit light at random in a time domain or controlling the plurality of light sources such that the light emission timings of the plurality of light sources do not overlap may more mitigate flickers to be less noticeable by the user, when compared to a case in which the light sources emit light periodically.

The controller 13 may control only one of the plurality of light sources 11a and 11b to emit light at random, or control both the plurality of light sources 11a and 11b to emit light at random. In this example embodiment, the plurality of light sources 11a and 11b include two light sources 11a and 11b, but may also include three or more light sources. When the plurality of light sources include three or more light sources, the controller 13 may control only one of the plurality of light sources to emit light at random, or control all of the plurality of light sources to emit light at random, or control some of the plurality of light sources to emit light at random. The more light sources emit light at random, the fewer flickers the user recognizes.

Likewise, the controller 13 may control the plurality of light sources 11a and 11b such that the light emission timings of the plurality of light sources 11a and 11b do not overlap. In this example embodiment, the plurality of light sources 11a and 11b includes two light sources 11a and 11b, but may also include three or more light sources. When the plurality of light sources include three or more light sources, the controller 13 may control the plurality of light sources such that the light emission timings of all of the plurality of light sources do not overlap or such that the light emission timings of some of the plurality of light sources do not overlap. The more light sources emit light at timings that do not overlap each other, the fewer flickers the user recognizes.

The light source device 10 may further include the light detector 12. The light detector 12 individually detects the light emission of the light sources 11a and 11b. The controller 13 individually controls the light sources 11a and 11b to emit light based on the detection results of the light detector 12. Even when a change in the temperature of the light sources 11a and 11b causes a change in the luminance of the light sources 11a and 11b, the light detector 12 detects the change in the luminance of the light sources 11a and 11b and feeds the detected change back to the controller 13, whereby the controller 13 may perform control to suppress the change in the luminance of the light sources 11a and 11b. According to some example embodiments, a change in the luminance of a light source caused by a change in the temperature of the light source may be suppressed.

Further, when the timings at which the light detector 12 detects the light emission of the light sources 11a and 11b are controlled not to overlap with each other, the light detector 12 may distinctively (separately) detect the light emission of the first light source 11a and the light emission of the second light source 11b. Therefore, the controller 13 may control the light emission of the first light source 11a based on the detected light emission of the first light source 11a and control the light emission of the second light source 11b based on the detected light emission of the second light source 11b, thereby individually controlling the light emission of the light sources 11a and 11b.

A detailed example of controlling the light sources 11a and 11b such that the timings at which the light detector 12 detects the light emission of the light sources 11a and 11b do not overlap will be described later.

Figure 5:
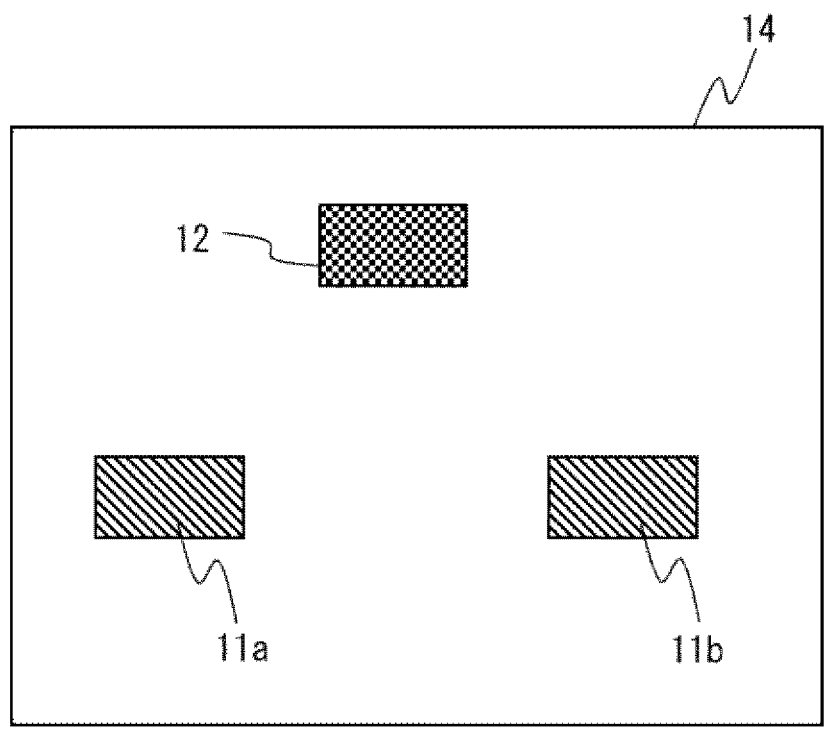
FIG. 5 illustrates an example arrangement of a light emission part according to an example embodiment.
Figure 7:
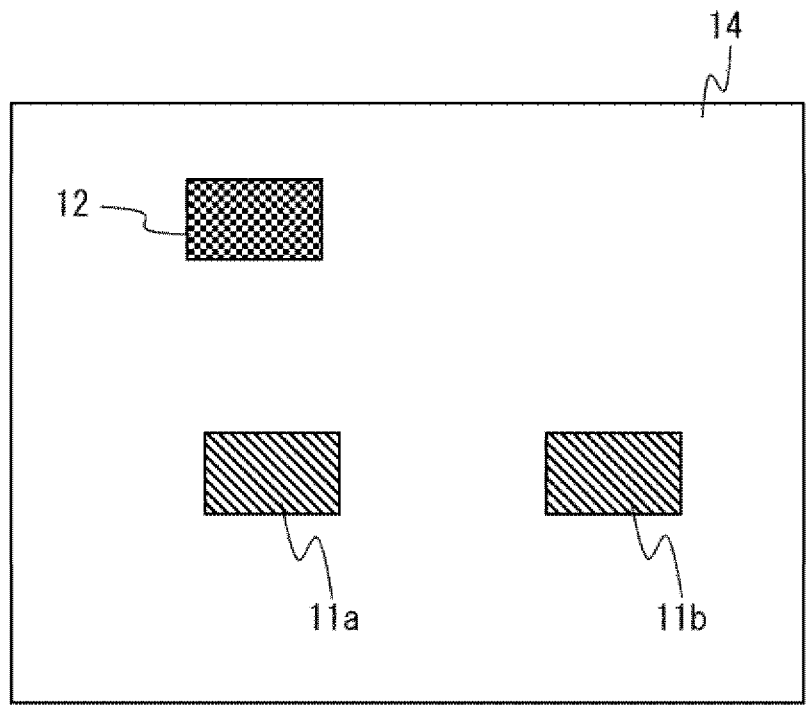
FIG. 7 illustrates an example arrangement of a light emission part according to an example embodiment.
Figure 8:
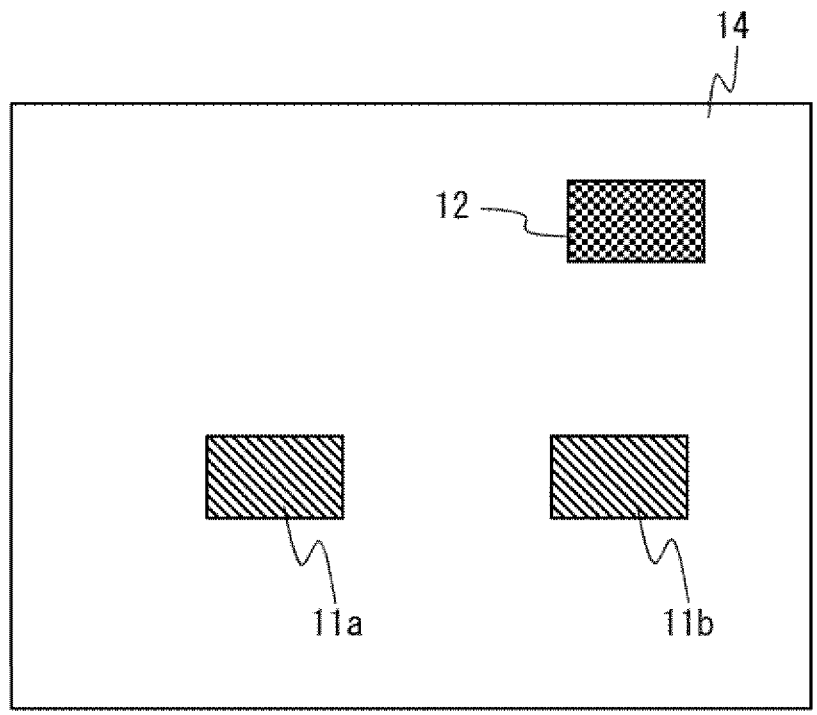
FIG. 8 illustrates an example arrangement of a light emission part according to an example embodiment.

FIGS. 5, 7, and 8 illustrate examples of an arrangement of the light emission part 14 according to some example embodiments. The light emission part 14 shown in FIGS. 5, 7, and 8 includes a single light detector 12 and two light sources 11a and 11b. However, the example embodiments are not limited thereto. For example, the light emission part 14 may include a plurality of light detectors and three or more light sources.

FIG. 5 illustrates an example of an arrangement of the light emission part 14 according to an example embodiment. In this example embodiment, the distance between the light detector 12 and the first light source 11a and the distance between the light detector 12 and the second light source 11b are substantially the same. In other words, the light detector 12 is positioned at substantially the same distance from the first light source 11a and the second light source 11b.

Figure 6:
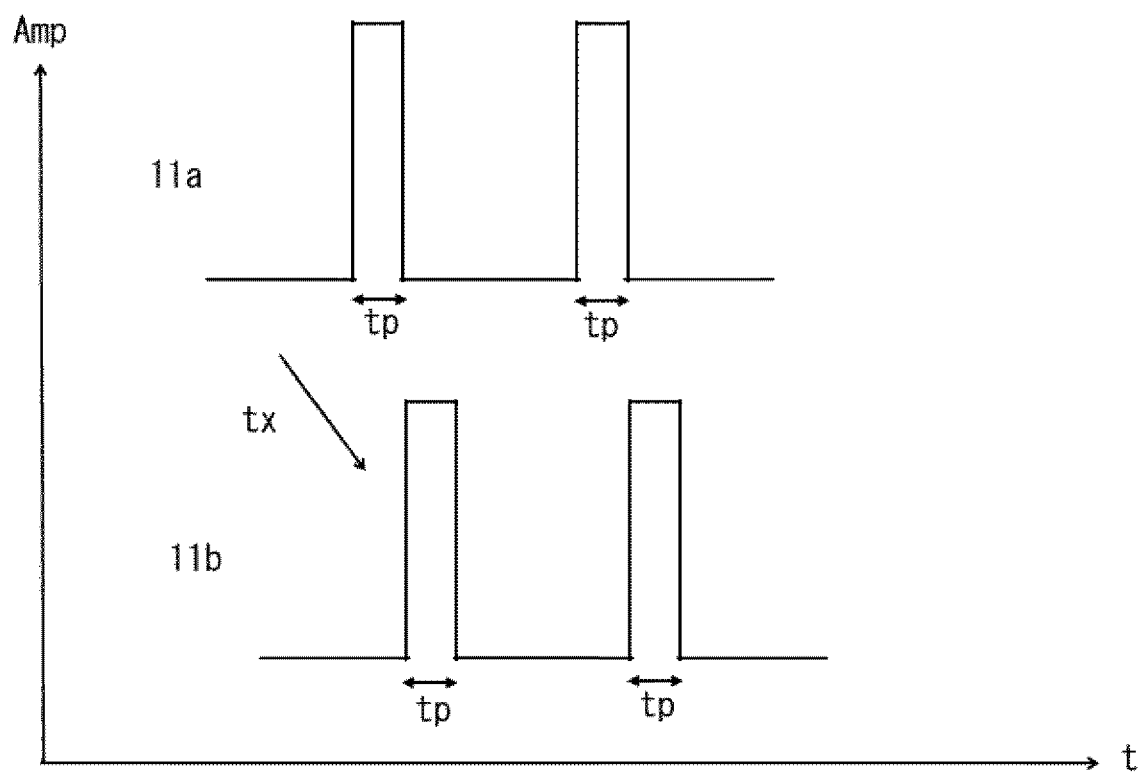
FIG. 6 illustrates driving pulses according to an example embodiment.

FIG. 6 illustrates driving pulses for driving the light sources 11a and 11b by the controller 13, in the light emission part 14 of FIG. 5, according to an example embodiment. In FIG. 6, the driving pulse on the upper side is the one used for control of light emission of the first light source 11a, and the driving pulse on the lower side is the one used for control of light emission of the second light source 11b.

Referring to FIG. 6, the controller 13 generates the driving pulses for the light sources 11a and 11b by delaying the pulse timing of the driving pulse for the second light source 11b by tx behind the pulse timing of the driving pulse for the first light source 11a. By the driving pulses of FIG. 6, the light emission timing of the second light source 11b is delayed by tx behind the light emission timing of the first light source 11a. As the light emission timing of the second light source 11b is delayed by tx behind the light emission timing of the first light source 11a, the light emission timings of the light sources 11a and 11b do not overlap. Since the light emission timings of the light sources 11a and 11b do not overlap, the timings at which the light detector 12 detects the light emission of the light sources 11a and 11b do not overlap as well.

The controller 13 may control the light emission timing of the second light source 11b to be delayed by a first time tx behind the light emission timing of the first light source 11a and control the first time tx to be greater than the light emission time tp of the first light source 11a, thereby controlling the plurality of light sources 11a and 11b such that the light emission timings of the plurality of light sources 11a and 11b do not overlap. By controlling the time difference tx between the light emission timing of the first light source 11a and the light emission timing of the second light source 11b to be greater than the light emission time tp of the first light source 11a, it is possible to ensure that the timings at which the light emissions of the light sources 11a and 11b are detected do not overlap.

Further, the light detector 12 may not be positioned at substantially the same distance from the plurality of light sources 11a and 11b. For example, as shown in FIG. 7, the first light source 11a may be disposed closer to the light detector 12 than the second light source 11b is. As shown in FIG. 8, the second light source 11b may be disposed closer to the light detector 12 than the first light source 11a is. Even in the cases described above, the difference between the detection timings caused by the difference in the distances from the respective light sources to the light detector 12 may be negligible. Thus, control in the same manner as that for the driving pulses shown in FIG. 6 may be possible. According to another example embodiment, if the distance from the first light source 11a to the light detector 12 and the distance from the second light source 11b to the light detector 12 are not substantially the same, as shown in FIGS. 7 and 8, the controller 13 may control the light sources 11a and 11b in view of the distance from the first light source 11a to the light detector 12 and the distance from the second light source 11b to the light detector 12.

In the above example embodiments, the method of delaying the light emission timing of the second light source 11b behind the light emission timing of the first light source 11a has been described. However, according to another example embodiment, control to delay the light emission timing of the first light source 11a behind the light emission timing of the second light source 11b may be performed.

Further, the light emission part 14 may include a plurality of light sources including the two light sources 11a and 11b. In some example embodiments, the light emission part 14 may include three or more light sources. The plurality of light sources provided in the light emission part 14 may be arranged in the form of a lattice. In this case, the light sources 11a and 11b may be adjacent or nearest light sources of the plurality of light sources arranged in the form of a lattice, or may be light sources that are apart from each other.

The light emission part 14 includes a plurality of light detectors. The plurality of light detectors may correspond to the plurality of light sources 11a and 11b, respectively. Each of the plurality of light detectors detects the light emission of a corresponding light source. For example, the light emission part 14 may provide a first light detector corresponding to the first light source 11a and a second light detector corresponding to the second light source 11b. The first light detector detects the light emission of the first light source 11a, and the second light detector detects the light emission of the second light source 11b. In this case, even if the light emission timings of the light sources 11a and 11b overlap, each of the light detectors may individually obtain the light emission of the corresponding light source. Based on detection results individually obtained by the light detectors in relation to the light emission of the light sources, the controller 13 may individually control the light sources 11a and 11b. Further, even in this case, by controlling one or more of the plurality of light sources 11a and 11b to emit light at random in a time domain or by controlling the plurality of light sources 11a and 11b such that the light emission timings of the plurality of light sources 11a and 11b do not overlap, flickers may be mitigated.

As described above, by individually providing the light detector 12 for each light source, the control may be more easily performed. Meanwhile, as in the configurations shown in FIGS. 5, 7, and 8, a configuration in which a single light detector 12 detects the light emission of a plurality of light sources may reduce the number of light detectors 12 to be provided in a light source device.

The light source device 10 may be configured to not include the light detector 12. The controller 13 may control the light sources 11a and 11b to have a desired luminance based on a correspondence of a preset luminance of a light source and a control signal, rather than using the detection results obtained by the light detector 12. Even in this configuration, by controlling one or more of the plurality of light sources 11a and 11b to emit light at random in a time domain or by controlling the plurality of light sources 11a and 11b such that the light emission timings of the plurality of light sources 11a and 11b do not overlap, flickers may be mitigated.

The light source device 10 described above may be applied to a backlight light source of a head-up display (HUD). The HUD may be implemented, for example, by a thin film transistor (TFT) scheme. The HUD may further include the lens L, the brightness enhancement film F, and the liquid crystal panel P shown in FIG. 1, in addition to the light source device 10 described above.

The HUD is used in a variety of areas such as aircraft control, vehicle driving, medical, and computer game. For example, in the field of automobiles, the HUD is used to support safe vehicle driving, such as to indicate the speed of a vehicle or to indicate an arrow showing the travel direction of the vehicle. In recent years, the technology of augmented reality (AR) HUD to match and project a display onto a scene during actual driving has drawn attention.

The HUD needs to improve the visibility of the content displayed by field of view extension, high luminance, and high precision, and/or to display user-friendly images in terms of form and position. In addition, the HUD includes issues in the suppression of the postcard effect, the uniformity of screen brightness, and high contrast.

Furthermore, the luminance of an image projected by the HUD needs to correspond to the driving situation of a vehicle. For example, when a vehicle is traveling on a snowy road with a clear sky above, the display of the HUD requires a high luminance (for example, 10 thousand nits or more). In this state, when the display of the HUD becomes dark, a driver may not recognize the display of the HUD. On the other hand, when the vehicle is traveling in the dark, the display of the HUD requires a quite low luminance (for example, about a few nits). In this state, when the display of the HUD is in a high luminance, the driver may recognize the display of the HUD, but may not recognize the scene outside the vehicle during driving. As such, light sources used in the HUD need to provide a wide dynamic range.

To solve this problem, local dimming technology of light sources to individually control the luminance or light emission amounts of a plurality of LED elements is introduced. Particularly, if it is possible to control multiple LED elements with high accuracy, the above problem may be solved.

Due to the characteristics of the LED elements used by the HUD, stable control of light emission of the LED elements in a wide dynamic range requires direct current (DC) lighting control of controlling the voltage to be applied to the LED elements for implementing a large light emission amount and PWM for implementing a low light emission amount. However, as described above, in a low light emission state, the width of light emission time of a light pulse is narrow, and the interval between light pulses is long, and thus flickers easily occur. This may cause the driver of the vehicle to recognize the display of the HUD as flickers while driving in the dark, such that the driver may not recognize the display accurately. When the driver recognizes the flickers of the display of the HUD, the fatigue of the driver may increase. Thus, in the related art, safe driving, which is a critical issue in automobiles, is hindered.

As described above, the light source device 10 according to some example embodiments may control one or more of a plurality of light sources to emit light at random in a time domain or control the plurality of light sources such that the light emission timings of the plurality of light sources do not overlap, thereby mitigating flickers. Therefore, a display of a HUD in which flickers are suppressed even in a low light emission state is possible, thereby ensuring safe driving.

According to some example embodiments, by detecting the light emission of each of the plurality of light sources (for example, LED elements), it is possible to accurately control the light emission of each light source. Then, even when the luminance of a light source changes due to a change in the temperature inside the light source device, the controller may control the luminance of the light source according to a situation such as a scene outside the vehicle. Accordingly, it is possible to provide resistance to temperature changes, high-accuracy local dimming, and contrast improvement (wide dynamic range).

The light source device 10 described herein may be provided as a light source device of not only a HUD but also any other type of a display.

Figure 9:
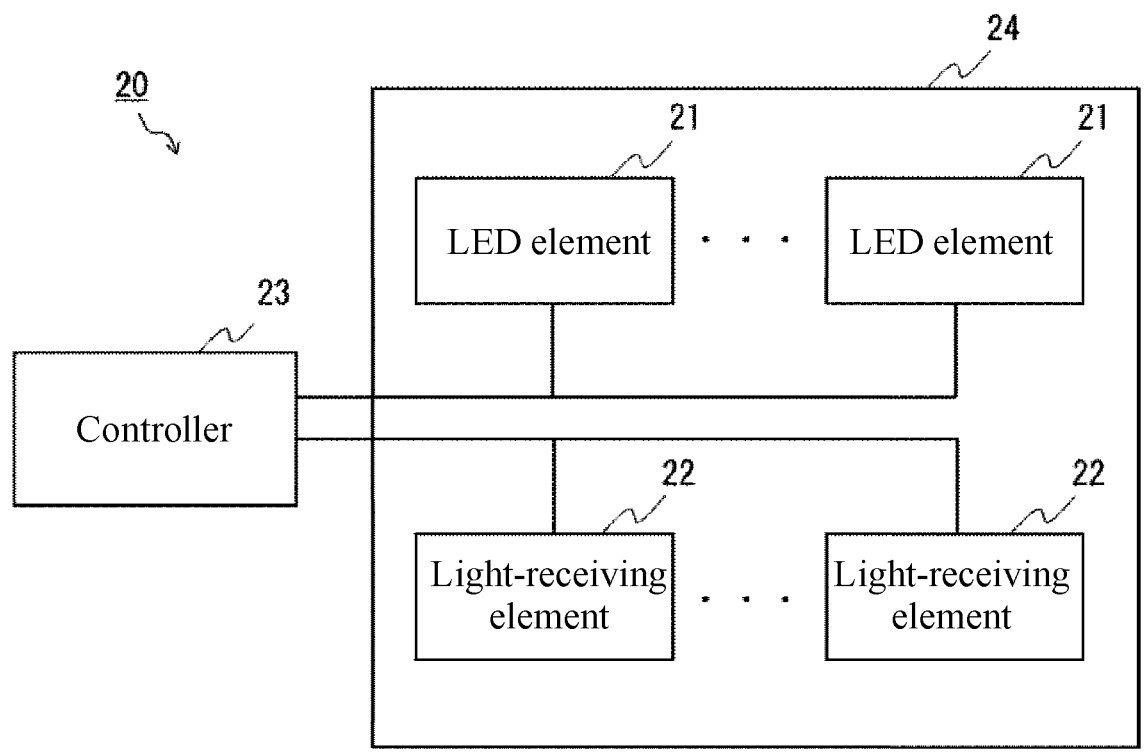
FIG. 9 is a block diagram illustrating a light source device according to an example embodiment.

FIG. 9 is a block diagram illustrating a light source device 20 according to an example embodiment. The light source device 20 may be provided as a backlight light source of a display. The light source device 20 includes a plurality of LED elements 21 and at least one controller 23. Further, the light source device 20 may further include a plurality of light-receiving elements 22. The LED elements 21 and the light-receiving elements 22 may be provided on an LED substrate 24. The light-receiving elements 22 operate as light detectors. The light-receiving elements 22 may be, for example, photodiodes, phototransistors, photoresistors, or light sensors. Each of the plurality of light-receiving elements 22 detects the light emission of a corresponding one of the plurality of LED elements 21. The controller 23 controls the plurality of LED elements 21. The controller 23 controls a corresponding one of the plurality of LED elements 21 based on detection results obtained by one of the plurality of light-receiving elements 22.

Figure 10:
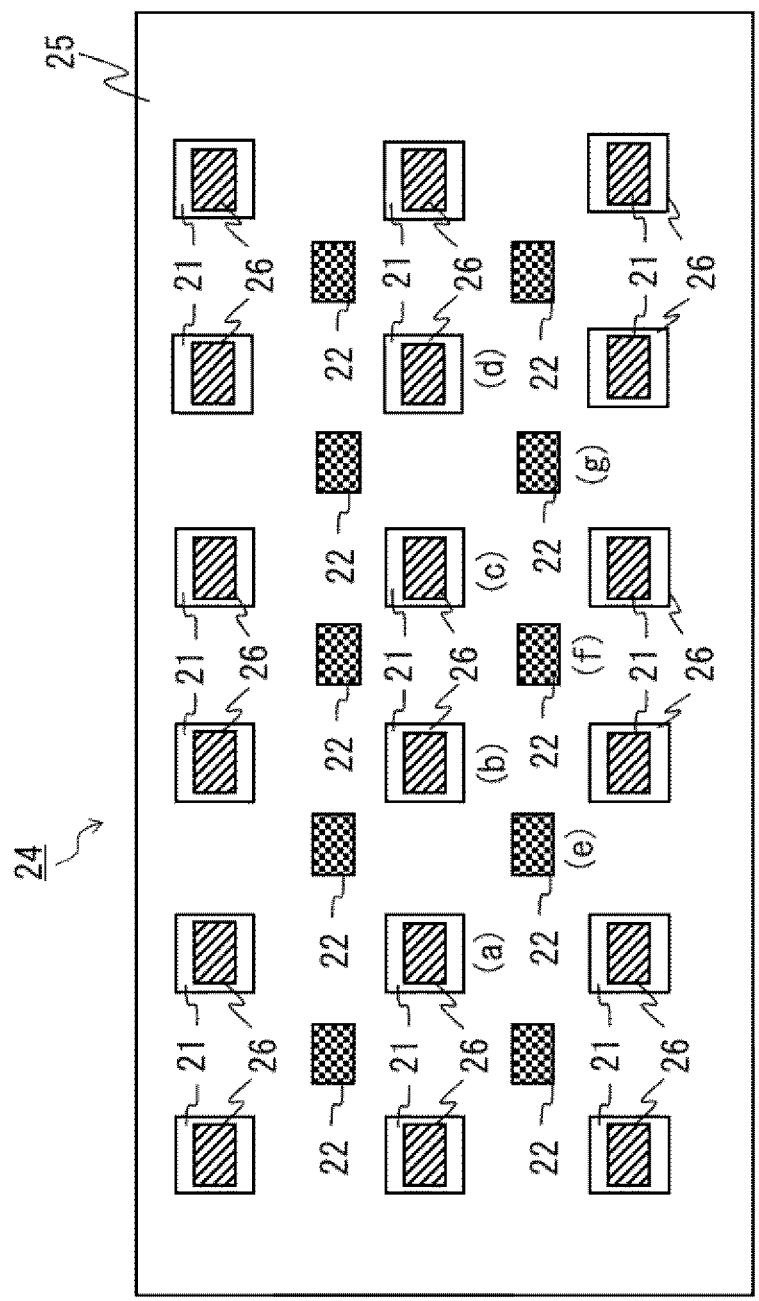
FIG. 10 illustrates an LED substrate according to an example embodiment.

FIG. 10 illustrates an LED substrate 24 according to an example embodiment. The LED substrate 24 includes a plurality of light sources 21 and a plurality of light detectors 22. The plurality of light sources 21 may be LED elements. Each of the LED elements 21 includes an LED chip 26. According to the arrangement shown in FIG. 10, the plurality of light sources 21 are arranged in the form of a square lattice, and each of the plurality of light detectors 22 is arranged at the center of four light sources arranged in the form of a square lattice. The plurality of light detectors 22 is also arranged in the form of a square lattice. A single light detector 22 is substantially equally distanced from the four LED elements 21 around the light detector 22. The light detector 22 arranged at the center of the four light sources 21 sequentially detects the light emissions of the four light sources 21, and provides results of detecting the light emissions of the four light sources 21 to the controller 23. Since the light emissions of the four light sources 21 do not overlap each other, the light detector 22 may individually detect the light emissions of the four light sources 21.

A lens L, a brightness enhancement film F, and a liquid crystal panel P as in FIG. 1 are provided on the LED substrate 24. The light source device 20, the lens L, the brightness enhancement film F, and the liquid crystal panel P constitute a display (or display device).

The controller 23 individually controls each LED element 21 to emit light by outputting a driving signal for DC lighting control or PWM to each LED element 21 based on a signal (results of detecting the light emission) from each light detector 22. Here, the controller 23 controls each LED element 21 to emit light at random, and also controls each LED element 21 to emit light such that the timings at which the respective light detectors 22 detect the light emissions of the LED elements 21 do not overlap. Hereinafter, specific control examples will be described.

Figure 11:
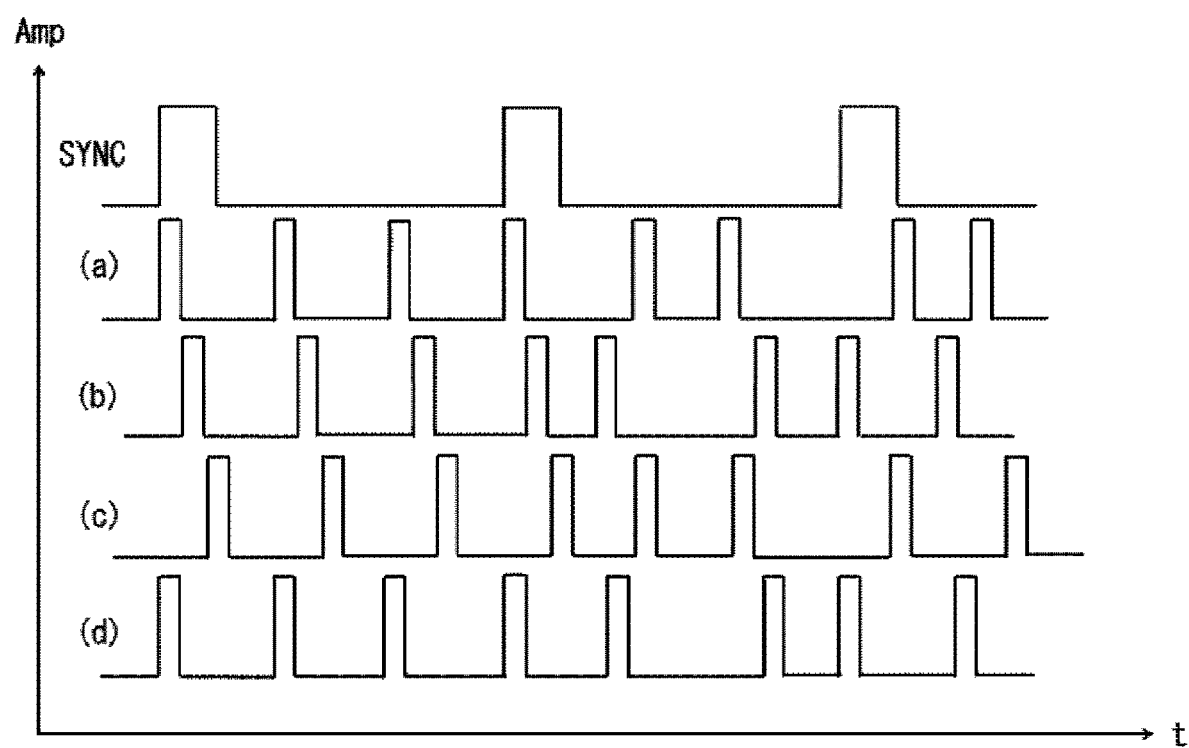
FIG. 11 illustrates examples of driving pulses according to an example embodiment.

FIG. 11 illustrates examples of driving pulses according to an example embodiment. In FIG. 11, driving signals (a), (b), (c) and (d) for four LED elements 21 (for example, (a), (b), (c) and (d) of FIG. 10) of the plurality of LED elements 21 of FIG. 10 are illustrated. Although FIG. 11 shows a synchronizing signal SYNC including three synchronizing pulses, it is a portion of the synchronizing signal, and those skilled in the art would understand that more synchronizing pulses are included in the synchronizing signal SYNC.

As shown in FIG. 11, the driving pulses included in the plurality of driving signals (a) to (d) respectively corresponding to the plurality of LED elements (a) to (d) of FIG. 10 are nonperiodic and random. Accordingly, the light emission timings of the plurality of LED elements (a) to (d) of FIG. 10 are also nonperiodic and random.

According to an example embodiment, the controller 23 generates a series of driving pulses to be used for control of light emission of one or more of the plurality of light sources (for example, the plurality of LED elements) to have a random pulse interval in the time domain. By using the series of driving pulses, the controller 23 may control the one or more light sources to emit light at random in the time domain.

According to another example embodiment, the driving pulses included in the plurality of driving signals (a) to (d) respectively corresponding to the plurality of LED elements (a) to (d) of FIG. 10 do not overlap driving pulses of other driving signals. Accordingly, the light emission timings of the plurality of LED elements (a) to (d) of FIG. 10 also do not overlap.

By generating the driving signals for the LED elements in such manners, the controller 23 may control one or more of the plurality of LED elements to emit light at random in the time domain or control the plurality of LED elements such that the light emission timings of the plurality of LED elements do not overlap.

Driving signals (a) and (b) in FIG. 11 are driving signals provided to the LED elements (a) and (b) of FIG. 10. As shown in FIG. 11, the driving pulses (a) and (b) of the nearest (or adjacent) LED elements ((a) and (b) in FIG. 10) do not overlap each other. Thus, in FIG. 10, the light detector (e), which is substantially equally distanced from the LED elements (a) and (b), may separately detect the light emissions of the LED elements (a) and (b) even when the light emitted from the LED elements (a) and (b) are received by the same light detector (e). In FIG. 10, the light detector (f), which is substantially equally distanced from the LED elements (b) and (c) adjacent to each other, may separately detect the light emissions of the LED elements (b) and (c). In FIG. 10, the light detector (g), which is substantially equally distanced from the LED elements (c) and (d) adjacent to each other, may separately detect the light emissions of the LED elements (c) and (d).

As described above, as the light emission amount of an LED element decreases, the light emission time width of light pulses decreases, and the interval (the time from an ON of light emission to the next ON of light emission) of the light pulses increases. This ON-OFF of light emission is recognized as a flicker by the user. However, as shown in FIG. 11, the controller 23 removes the periodicity of light pulses of each LED element and generates the light pulses to have a random interval, such that the user rarely recognizes flickers.

Figure 12:
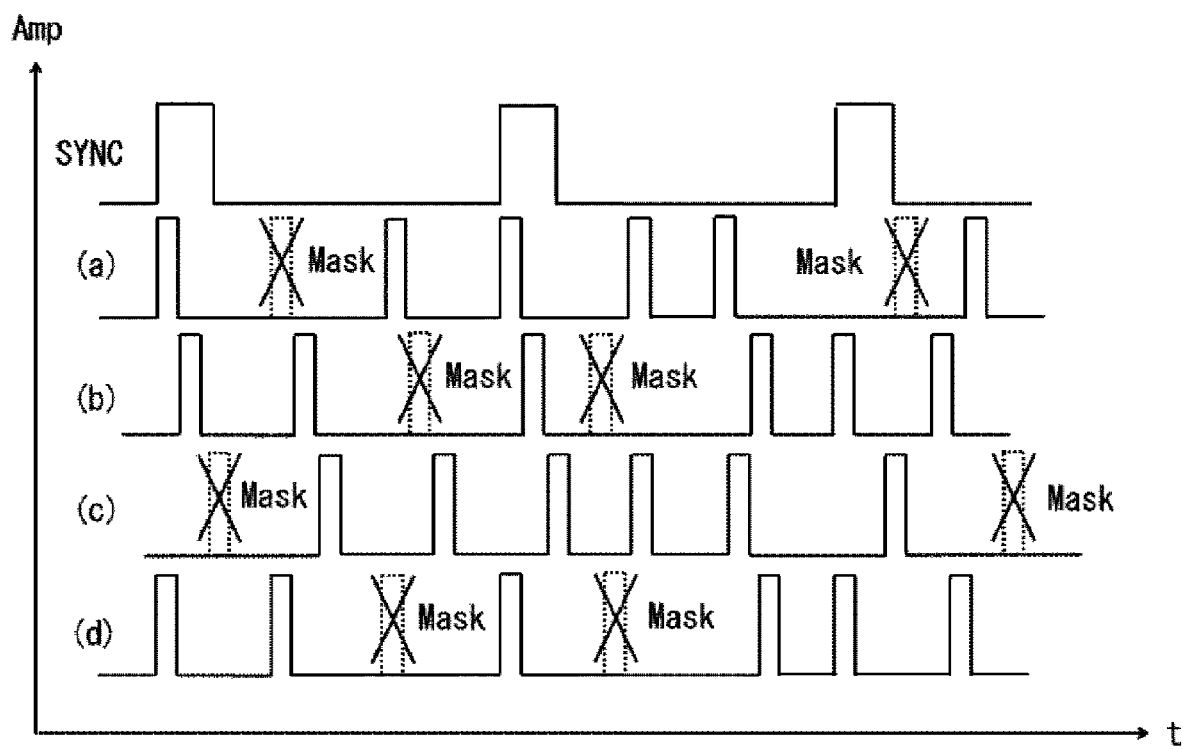
FIG. 12 illustrates examples of driving pulses according to an example embodiment.

FIG. 12 illustrates examples of driving pulses according to an example embodiment. In FIG. 12, the controller 23 performs control to mask a portion of driving pulses to be used for control of light emission of one or more of a plurality of light sources (for example, the LED elements 21 of FIG. 10).

The example of FIG. 12 may apply to further decrease a light emission amount in the example of controlling the light emission timings shown in FIG. 11 (for example, in a case of a so-called ultra-low luminance in which the light emission amount is less than or equal to a predetermined threshold). For example, the controller 23 may perform control to mask a portion of the driving pulses to be used for control of light emission of one or more of the plurality of light sources, in which one or more of the plurality of light sources (for example, the LED elements 21 of FIG. 1) are controlled to emit light in a light emission amount less than or equal to a predetermined threshold light emission amount.

The controller 23 may select, at random, a portion of a series of driving pulses to be used for control of light emission of the one or more light sources, and perform control to mask the selected portion of driving pulses. A driving signal to be used for control of light emission of an LED element (for example, (a) of FIG. 10) may be a signal (a) of FIG. 12. The driving signal (for example, (a) of FIG. 12) includes a series of driving pulses. A portion of the plurality of driving pulses included in the driving signal is selected at random. For example, in FIG. 12, two driving pulses are selected at random from among the driving pulses included in the driving signal (a). The selected driving pulses are masked. FIG. 12 shows that two driving pulses included in the driving signal (a) are masked. Similarly, a portion of driving pulses included in each of the driving signals (b), (c), and (d) is selected at random, and the selected driving pulses are masked. Since the masked driving pulses are in an OFF state, a corresponding light source does not emit light at these timings.

In FIG. 12, a portion of the driving pulses included in each of the driving signals (a) to (d) is masked, and a corresponding light source does not emit light at the timings of the masked pulses. Thus, the overall light emission amount is reduced. Further, since the timings for masking are random in the time domain, flickers may be mitigated.

In FIG. 12, the operation of masking a portion of driving pulses is performed for all of the driving pulses (a) to (d) for the plurality of light sources (a) to (d) of FIG. 10. However, according to an example embodiment, the operation of masking driving pulses may be performed only for a portion of the driving pulses (a) to (d). For example, in the example of FIG. 12, the operation of masking a portion of a series of driving pulses may be performed only for the driving pulses (a) and (b) and not for the driving pulses (c) and (d).

In the examples above, the control of light emission of (a) to (d) of the LED elements 21 of FIG. 10 is illustrated. However, the same control of light emission may be performed for all of the LED elements 21 including (a) to (d). In detail, for all driving signals for all LED elements 21 included in an LED display device, the operation of masking a portion of driving pulses included in each driving signal may be performed.

Further, according to an example embodiment, a configuration for controlling the light emission timings to be random, periodic, or masked may be added.

For example, the light emission timings may be random in the time domain, and the driving pulses may not be masked.

According to another example embodiment, the light emission timings may be periodic in the time domain, and the driving pulses may be masked at random. In this case, the controller 23 generates a series of driving pulses to be used for control of light emission of one or more of the plurality of light sources to have a substantially uniform pulse interval in the time domain. The controller 23 selects, at random, a portion of the series of driving pulses to be used for control of light emission of the one or more light sources, and performs control to mask the selected portion of driving pulses.

According to still another example embodiment, the light emission timings may be random in the time domain, and the driving pulses may be masked at random. In this case, the controller 23 controls the one or more light sources to emit light at random in the time domain by generating the series of driving pulses to have a random pulse interval in the time domain. The controller 23 selects, at random, a portion of the series of driving pulses to be used for control of light emission of the one or more light sources, and performs control to mask the selected portion of driving pulses.

Further, such control may be performed on all of the light sources or LED elements, or on a portion thereof. Flickers may further be mitigated through such control.

Figure 13:
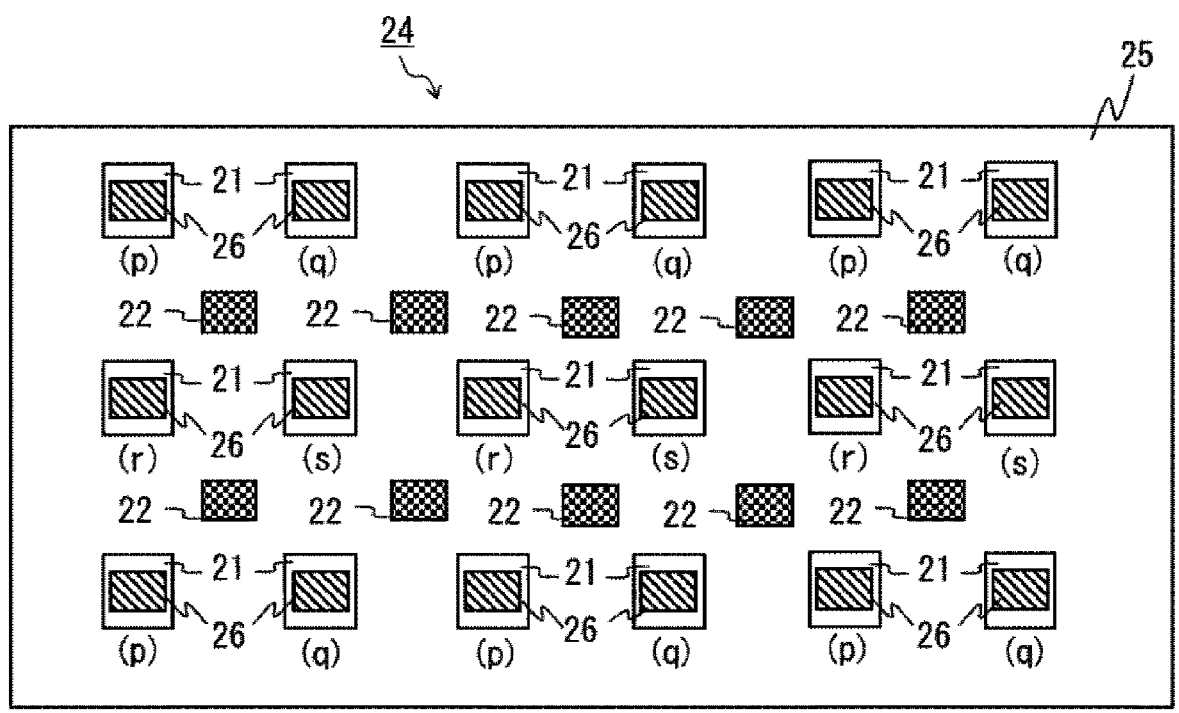
FIG. 13 illustrates an LED substrate according to an example embodiment.

FIG. 13 illustrates the LED substrate 24 according to an example embodiment. The LED substrate 24 includes a substrate body 25, a plurality of light sources 21, and a plurality of light detectors 22. The plurality of light sources 21 may be LED elements. Each of the LED elements 21 includes an LED chip 26. According to the arrangement shown in FIG. 13, the plurality of light sources 21 are arranged in the form of a square lattice, and each of the plurality of light detectors 22 is arranged at the center of four light sources arranged in the form of a square lattice. The plurality of light detectors 22 is also arranged in the form of a square lattice. A single light detector 22 is substantially equally distanced from the four LED elements 21 around the light detector 22. In FIG. 13, the LED elements 21 are divided into four groups (p), (q), (r), and (s).

Figure 14:
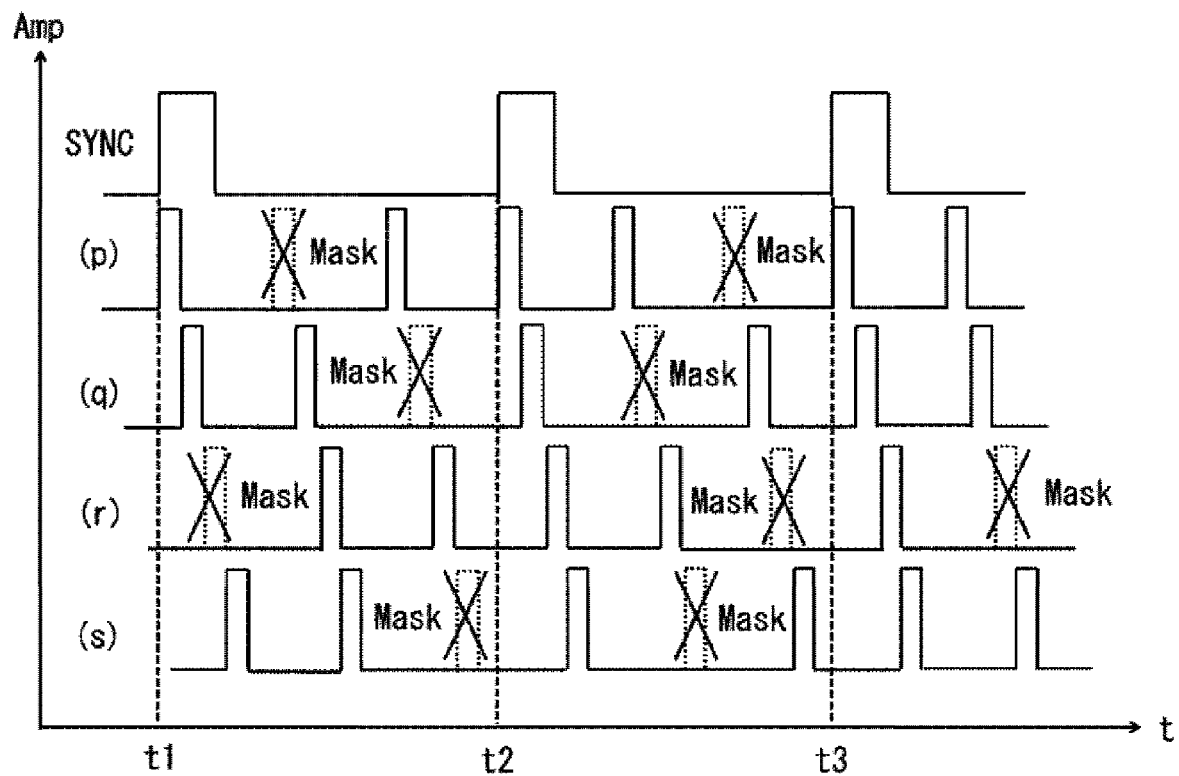
FIG. 14 illustrates examples of driving pulses according to an example embodiment.

FIG. 14 illustrates examples of driving pulses according to an example embodiment. In FIG. 14, driving signals (p), (q), (r), and (s) for each of the four groups (p) to (s) of the LED elements 21 of FIG. 13 are illustrated. In FIG. 14, the driving pulses of the driving signals (p) to (s) before the masking operation are periodic but do not overlap each other. In detail, the driving signal (p) is synchronized with a rise of a synchronizing signal SYNC and includes driving pulses at times t1, t2, and t3. The driving signal (q) has a later timing of a light emission pulse than the driving signal (p), the driving signal (r) has a later timing of a light emission pulse than the driving signal (q), and the driving signal (s) has a later timing of a light emission pulse than the driving signal (r). The light emission timings of the four groups (p) to (s) of the LED elements 21 are controlled by these driving signals to not overlap each other.

By these driving signals, a light detector 22 may individually and sequentially receive light from four light sources (p) to (s). The light detector 22 is arranged at the center of the four light sources (p) to (s) and substantially equally distanced from the four light sources (p) to (s).

According to this example embodiment, a single light detector 22 may individually detect the light emissions of four light sources (p) to (s). Thus, it is possible to monitor the luminance of all light sources while reducing the number of light detectors 22.

Further, the driving pulse timings of the driving signals (p) to (s) shown in FIG. 14 are periodic. When a portion of the driving pulses of each of the driving signals (p) to (s) is controlled to be masked at random, the light sources (p) to (s) of FIG. 13 emit light at random. This mask control mitigates flickers. In an example embodiment, this control may be performed when the light emission amount of a light source is less than or equal to a predetermined threshold.

According to the example embodiment of FIG. 14, all of the light sources of the light source device may be sufficiently controlled by one of the four types of driving signals. Thus, it is possible to reduce the types of driving signals for controlling the light source device, compared to the example embodiment of FIG. 12.

In the example embodiments described above, the luminance value of each light source 21 may be individually obtained based on the light emission peak value of the light source detected by the light detector 22, the light emission time of a light pulse of the light source, and the distance from the light detector 22 to each of the nearest four light sources 21. By performing control to adjust the obtained luminance value to a target luminance value of each light source 21, it is possible to individually control the luminance of each light source 21. Through such a luminance control, the uniformity of display luminance in the entire light source device 20 may be increased, and a luminance change caused by a temperature change may be suppressed.

In the luminance control, the light detector 22 may possibly detect the light emission of a light source 21 that is not the light source that is nearest to the light detector 22. In this case, the luminance control may be performed such that a light emission luminance that is less than a certain level may be ignored or the detected light emission value may be processed as noise or any other suitable manner that is obvious to those skilled in the art.

According to an example embodiment, it is possible to calibrate a sensitivity difference between the plurality of light detectors 22. There may be a difference in the light detection results of the light detectors 22 for the same light from the same light source. An example embodiment provides a configuration for calibrating this difference.

In FIG. 13, with respect to a light source 21 (hereinafter referred to as a first light source) that is not provided at any of four corners of the LED substrate 24, there are two light detectors 22 (a first light detector and a second light detector) that are approximately equally distanced from the light source 21. When the first light source emits light, the two light detectors 22 detect the light emission of the corresponding first light source. The first light detector and the second light detector detect the light emission of the first light source of the plurality of light sources. The distance between the first light detector and the first light source and the distance between the second light detector and the first light source are substantially the same. The controller may calibrate a sensitivity difference between the first light detector and the second light detector based on a result of detecting the light emission of the first light source by the first light detector and a result of detecting the light emission of the first light source by the second light detector.

If the first light detector and the second light detector have the same sensitivity, the detection results provided by the first light detector and the second light detector by detecting the light emission of the first light source are substantially the same value. However, if the first light detector and the second light detector have different sensitivities, the detection results provided by the first light detector and the second light detector by detecting the light emission of the first light source are different values. That is, there is a sensitivity difference between the first light detector and the second light detector. In this case, the calibration of the sensitivity difference between the first light detector and the second light detector may be performed based on the results of detecting the light emission of the first light source by the first light detector and the results of detecting the light emission of the first light source by the second light detector.

A single light detector 22 may detect the light emissions of the light sources 21 provided at the four corners of the LED substrate 24, and calibration is not needed for these light sources 21. In addition, the two light detectors 22 (that is, the first light detector and the second light detector) associated with the calibration may not be approximately equally distanced from the LED element 21 (or the first light source) with respect to which calibration is performed. However, a comparison of the two detection results obtained by the first and the second light detectors 22 may be more easily performed if the first and the second light detectors 22 are approximately equally distanced from the corresponding LED element 21.

According to the example embodiments described above, it is possible to suppress flickers by the control of the light source device 20 even in a low light emission state, thereby displaying an image on a display with great visibility. Further, it is possible to detect the luminance of each light source 21 (for example, LED element) and perform accurate control (e.g., high-accuracy local dimming). Therefore, even if there is a temperature change involved in an operation in the light source 21 or another component, it is possible to suppress a non-uniform luminance distribution of the light source 21 and/or to improve the contrast of an image.

Particularly, the following effects are achieved according to the example embodiments described above.

(1) Since the light emission is controlled such that light pulses of adjacent light sources 21 (for example, LED elements) do not overlap, the light sources 21 and the light detectors do not need to be provided in one-to-one correspondence. The luminance values of the LED elements 21 may be obtained by fewer light detectors 22. Accordingly, the uniformity of images is improved.

(2) Since it is possible to calibrate the sensitivity difference between the light detectors 22, the uniformity of images is further improved.

(3) By supplying current to the light sources 21 at different timings, it is possible to reduce a change in current consumption. This may alleviate the load of driving power and suppress electromagnetic waves produced by the light source device 20. This is also advantageous in terms of electromagnetic compatibility (EMC).

While the above descriptions (1)-(3) are made with respect to the light source device 20 as shown in FIG. 9 as an example, the same descriptions apply to the light source device 10 as shown in FIG. 4.

The light source devices 10 and 20 in the example embodiments described above may be not only provided as light source devices of a typical display but also used as backlight light sources of a HUD. In addition, if the sensitivity difference between the light detectors 22 for the light emission of the same light source is calibrated when the light source devices 10 and 20 are used, the uniformity of the entire screen is further improved.

Hereinafter, in addition to the above example embodiments, a method of detecting the light emission amounts of the light sources 21 with high accuracy by the light detectors 22 even when the light detectors 22 have low resolutions will be described.

In a light source device applied to a display, it is important to improve the dynamic range of an image. For example, a luminance ratio in an image displayed by a HUD is from about 1:3000 to 1:4000. In order to accurately detect light of such a large dynamic range using a light detector, a circuit with a 12-bit (4096-step) resolution is insufficient, and a circuit with a 13 to 14-bit resolution is needed. If the light detectors 22 are capable of detecting the light emission amounts of the light sources 21 with high accuracy even when the light detectors 22 have low resolutions, the circuit for the light source device may be simplified, and the cost for the light source device may be reduced.

Figure 15:
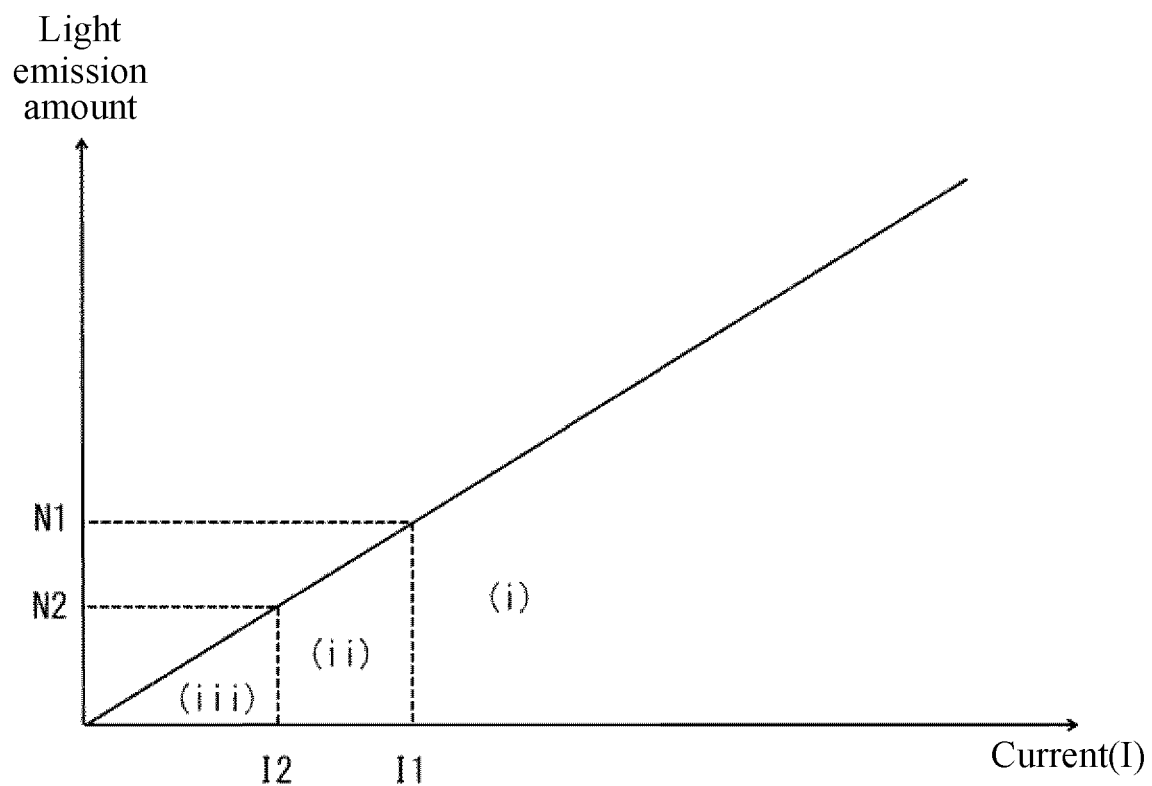
FIG. 15 is a graph illustrating control of light emission according to an example embodiment.

FIG. 15 is a graph that describes control of light emission according to an example embodiment. In particular, FIG. 15 is a graph that describes a method for controlling light emission of a light source (for example, LED element), for example, to meet desired luminance requirements in a HUD. In FIG. 15, the vertical axis denotes a light emission amount, and the horizontal axis denotes a value of DC flowing in an LED element.

In FIG. 15, an area where the DC value is greater than or equal to I1 and the light emission amount is greater than or equal to N1 is defined as an area (i), an area where the DC value is less than I1 and greater than or equal to I2 and the light emission amount is less than N1 and greater than or equal to N2 is defined as an area (ii), and an area where the DC value is less than I2 and the light emission amount is less than N2 is defined as an area (iii). The DC value input to a light source and the luminance value of the light source are in a linear relationship, where I1>I2, and N1>N2. Further, as described above, a light emission amount refers to an amount of light emitted in a predetermined time for which a light pulse continues. The light emission amount is calculated as a value obtained by multiplying the pulse width of light pulses by the peak value of the light pulses. The peak value of the light pulses corresponds to the luminance value.

According to an example embodiment, DC lighting control is performed in the area (i), control by PWM is performed in the area (ii), and control by PWM and control to mask driving pulses is performed in the area (iii). By such controls, the luminance of the light sources is individually controlled. In this example embodiment, if the light emission amount is large, PWM or DC lighting control is used to individually control the luminance of the light sources. However, the control to mask a portion of the driving pulses is effective in eliminating flickers even when a light emission amount is large. Thus, according to another example embodiment, the control to mask a portion of the driving pulses may be used to control the luminance of the light sources even when the light emission amount is large. The DC lighting control is a method of controlling the light emission amount or the luminance of a light source by changing the value of current flowing in the light source. The PWM control is a method of controlling the light emission amount or the luminance of a light source by changing the pulse width of light pulses emitted by the light source.

The controller may perform control to mask a portion of the driving pulses to be used for control of light emission of one or more of the plurality of light sources, in a case where one or more of the plurality of light sources (for example, LED elements) are controlled to emit light in a light emission amount less than a first threshold light emission amount (for example, less than N2). For example, control to mask a portion of the driving pulses may be performed in the area (iii) of FIG. 15. The method of masking driving pulses has been described above, and thus, repetitive descriptions are omitted.

In a case of controlling one or more of the plurality of light sources (for example, LED elements) to emit light in a light emission amount less than the first threshold light emission amount (for example, less than N2), the controller may control the light emission of the one or more LED elements by changing the number of driving pulses within a predetermined time. The controller may change the number of driving pulses within the predetermined time by masking a portion of the driving pulses or using another method. For example, by masking one of the three driving pulses within a time from t1 to t2 in FIG. 14, the number of driving pulses within this time may be changed from three to two. When the number of driving pulses within a predetermined time is changed in the manner described above, the luminance of a corresponding light source is also changed. The controller may change the number of driving pulses within a predetermined time using another method, rather than using the masking method. For example, the controller may decrease the number of driving pulses within the predetermined time by generating less driving pulses within the predetermined time, or increase the number of driving pulses within the predetermined time by generating more driving pulses within the predetermined time.

In a case of controlling one or more of the plurality of light sources (for example, LED elements) to emit light in a light emission amount greater than or equal to a second threshold light emission amount (for example, greater than or equal to N1), the controller may control the light emission of the one or more light sources by changing the value of current flowing in the one or more light sources. That is, the luminance of a light source may be adjusted through control by the DC lighting control in the area (i) of FIG. 15.

In a case of controlling one or more of the plurality of light sources (for example, LED elements) to emit light in a light emission amount greater than or equal to the first threshold light emission amount (for example, greater than or equal to N2) and less than the second threshold light emission amount (for example, less than N1), the controller may control the light emission of the one or more light sources by PWM. That is, the luminance of a light source may be controlled by PWM in the area (ii) of FIG. 15.

In the control of light emission, the relationship between the light emission amount (luminance value) of the light source and the DC value in the area (i) of FIG. 15, the relationship between the light emission amount of the light source and the duty ratio during the PWM control in the area (ii), and the relationship between the light emission amount of the light source and the amount of masking the driving pulses in the area (iii) may be obtained through pre-experiments. Further, during the DC lighting in the area (i), the relationship between the luminance value detected by a light detector and the luminance value of an actual light source may also be obtained through pre-experiments.

Figure 16:
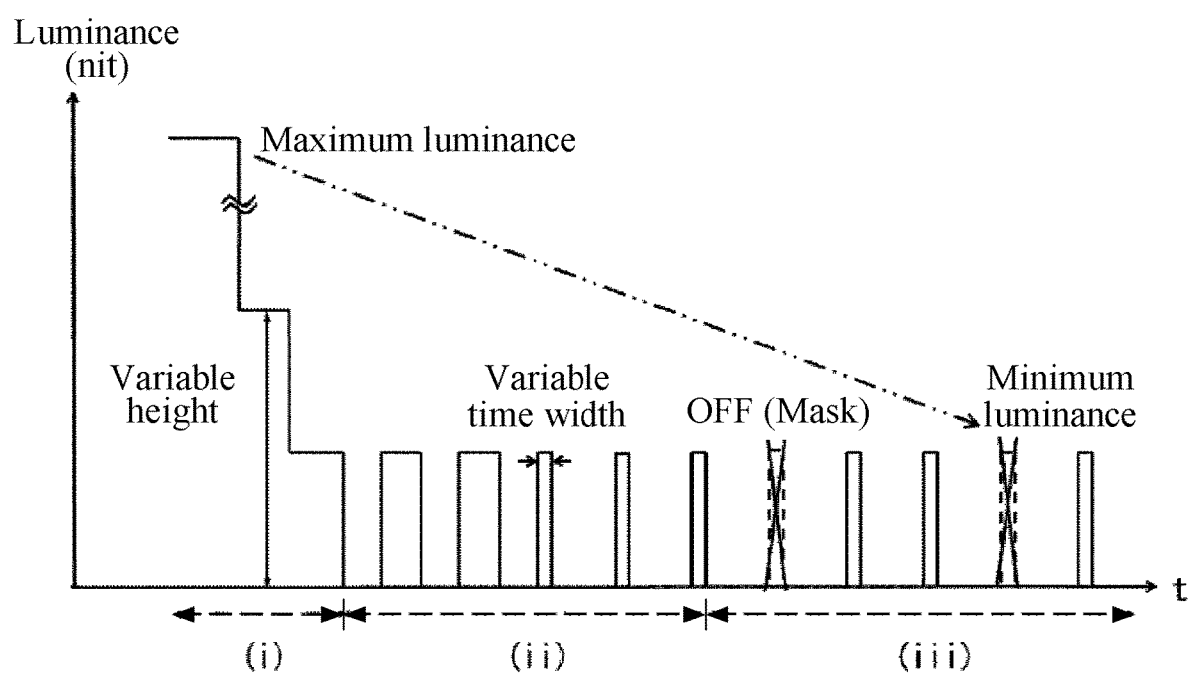
FIG. 16 illustrates examples of monitored waveforms of a light-receiving element according to an example embodiment.

FIG. 16 illustrates examples of monitored waveforms of a light-receiving element (for example, a light detector) according to an example embodiment. FIG. 16 shows examples of waveforms of light received by a light-receiving element in the case where the control methods described above are performed on the areas (i) to (iii) of FIG. 15.

Referring to FIG. 16, in the area (i) where the light emission amount is large, for example, is greater than or equal to N1, the peak value of the luminance of the light source (the height in the graph of FIG. 16) is changed by changing the current flowing in the light source (for example, LED element) by DC lighting. This peak value may increase up to a peak value corresponding to the maximum luminance. In the area (i), the peak value of the luminance of the light source is changed by changing the current flowing in the light source, and the light emission amount of the light source is changed accordingly.

In FIG. 16, in the areas (ii) and (iii) where the light emission amount is less than N1, the peak value in one light pulse of a light source does not change. Therefore, the waveform peak value monitored by the light-receiving element does not change in the areas (ii) and (iii). Since the current flowing in the light source is maintained the same in the areas (ii) and (iii), the peak value of the luminance of the light source is maintained the same.

In the area (ii) of FIG. 16, the pulse width (light emission time) of one light pulse is changed by PWM. Therefore, the duty ratio changes. As a result, the light emission amount monitored by the light-receiving element changes as well. In the area (ii), the pulse width of the light pulse emitted by the light source is changed by changing the pulse width of driving pulses for the light source, and the light emission amount of the light source is changed accordingly.

In the area (iii) of FIG. 16, the pulse width of one driving pulse or light pulse is minimized, and the pulse width may be narrowed no longer. In the area (iii), the light emission amount of the light source may not be changed using PWM. The controller performs control to mask a portion of the driving pulses if it is impossible to reduce the pulse width of the driving pulses by PWM. When a portion of the driving pulses is masked, the number of driving pulses within a predetermined time is changed, and the light emission amount of the light source is changed accordingly.

In a case of controlling one or more of the plurality of light sources to emit light in a light emission amount less than the first threshold light emission amount (e.g., in the area (iii)), the light emission of the one or more LED elements may be controlled by changing the number of driving pulses within the predetermined time. FIG. 16 shows an example of reducing the number of driving pulses within a predetermined time by masking a portion of the driving pulses. However, the number of driving pulses within the predetermined time may also be changed using another method. According to another example embodiment, in the area (iii), the number of light pulses within a predetermined time is changed by masking a portion of the driving pulses for a light source, and the light emission amount of the light source is changed accordingly.

In the areas (ii) and (iii) of FIG. 16, the light emission amount may be calculated by multiplying the peak value of the light pulse detected by the light-receiving element by the light emission period (pulse width) and calculating the result value as per unit time. Therefore, as described below, the detection dynamic range of the light-receiving element may be narrowed.

For example, it may be assumed that the maximum luminance in DC lighting control is A nits, the maximum current value at the maximum luminance is B mA, and the current value (e.g., I1 in FIG. 15) that is the threshold in control of light emission in DC lighting control is 1 mA. In this example, the luminance at the current value of 1 mA in the DC lighting control is A/B nits. Therefore, control by DC light control (e.g., the area (i)) is performed for the luminance from A/B nits to A nits. Further, control according to the area (ii) or (iii) is performed for the luminance less than A/B nits.

Therefore, the ratio of the maximum luminance to the luminance being the threshold for control is A:A/B=B:1. For example, if B is about tens or hundreds, the resolution required for the light-receiving element to realize the control of light emission described above is about 8 to 9 bits (256 to 512 steps), and a resolution of 13 to 14 bits is unnecessary. That is, the detection dynamic range required for the light-receiving element decreases. Therefore, a circuit for the light-receiving element may be manufactured at a considerably low cost.

In a HUD, control of luminance in a wide dynamic range using multiple LED elements is desirable. Therefore, reducing the detection dynamic range required for the light-receiving element according to some example embodiments has particularly great effects in the field of HUD.

Figure 17:
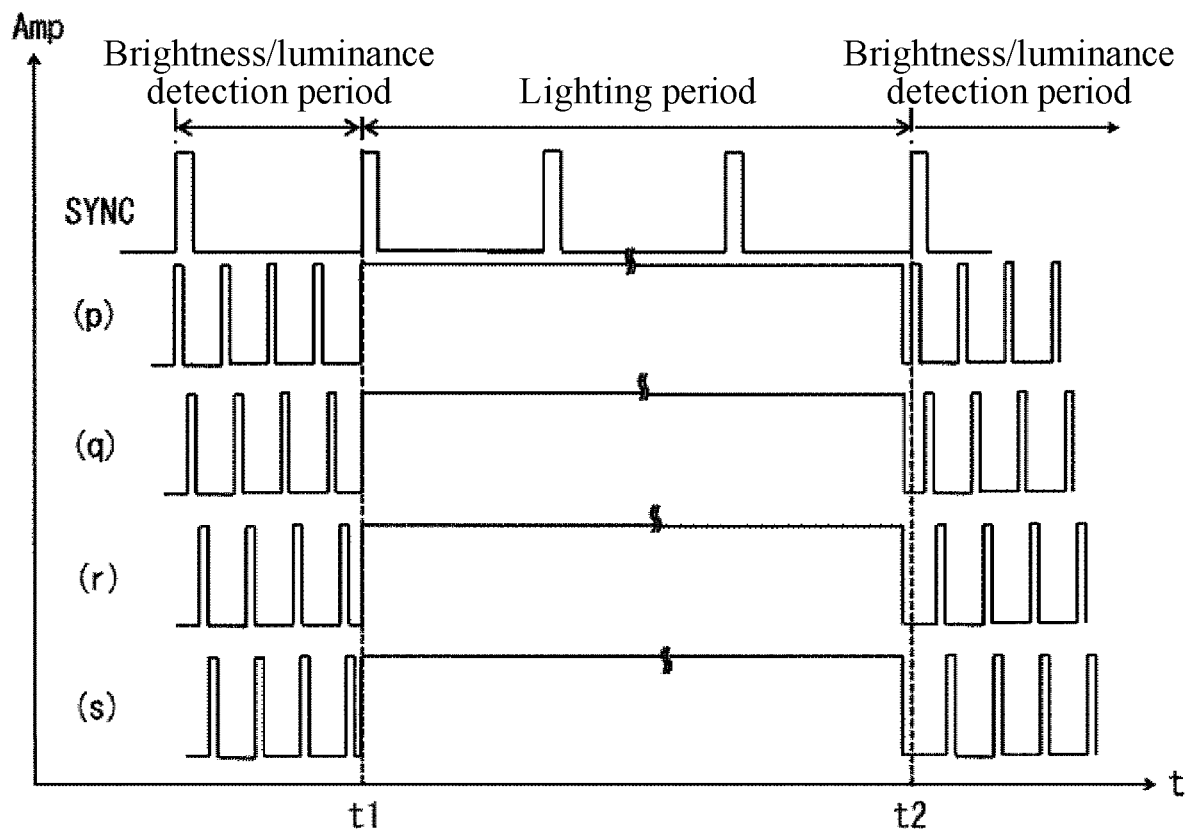
FIG. 17 illustrates examples of driving pulses according to an example embodiment.

FIG. 17 illustrates examples of driving pulses according to an example embodiment. In FIG. 17, driving signals (p) to (s) for each of the four groups (p) to (s) of the LED elements 21 of FIG. 13 are illustrated.

In FIG. 17, there is a brightness/luminance detection period before a time t1, and there is a lighting period between the time t1 and a time t2. Then, a brightness/luminance detection period starts again at the time t2.

Each of a plurality of light detectors (for example, the light detectors 22 of FIG. 13) detects the light emission of a corresponding one of the plurality of LED elements (for example, the LED elements 21 of FIG. 13).

A controller (for example, the controller 23 of FIG. 9) may determine the luminance value of a corresponding light source based on i) the light emission peak value of the corresponding light source detected by one of the plurality of light detectors, ii) the distance between the one light detector and the corresponding light source, and iii) the light emission time of one light emission of the corresponding light source, in a first period of time (for example, the brightness/luminance detection period of FIG. 17).

The controller (for example, the controller 23 of FIG. 9) may adjust the luminance value of this light source by controlling the light source based on the luminance value of the light source determined in the first period of time (for example, the brightness/luminance detection period of FIG. 17).

The controller (for example, the controller 23 of FIG. 9) obtains the relationship between the luminance value of an LED element corresponding to each of the plurality of light detectors and the driving pulses, based on detection results obtained by the plurality of light detectors in the first period of time (for example, the brightness/luminance detection period of FIG. 17). The controller controls the corresponding LED based on the obtained relationship in a second period of time (for example, the lighting period of FIG. 17).

In FIG. 17, the period before the time t1 is the brightness/luminance detection period. The brightness/luminance detection period is a period in which the luminance value of a light source is detected. Each LED element is controlled to emit light by the driving pulses having uniform peak value, pulse width, and pulse interval (duty ratio), and the luminance of each LED element is detected. In the brightness/luminance detection period, the peak value and the duty ratio of a driving pulse being a reference are determined, and a relationship between a luminance value for obtaining the desired luminance value and the driving pulse is obtained by comparing a luminance value predicted to be obtained by the driving pulse to a luminance value that is actually detected.

As shown in FIG. 17, in the brightness/luminance detection period, the timings of the driving pulses of the driving signals (a) to (d) are different from each other without overlapping. Since it is possible to control the light emission timings of the light sources to not overlap in the brightness/luminance detection period according to the example embodiments described above, the light-receiving element may individually detect the luminance of the light sources. Accordingly, the relationship between the luminance value for each light source and the driving pulse may be obtained, and the luminance of the light sources may be individually controlled using this relationship.

The period between the time t1 and the time t2 is the lighting period. In the lighting period, control of light emission amount is performed for the light sources. In this lighting period, lighting to control a light source to emit light in a desired light emission amount is performed using the relationship between the luminance value obtained in the brightness/luminance detection period and the driving pulse. In the lighting period, the DC lighting control, the control by PWM, and the control to mask the driving pulses or any combination thereof described in relation to the areas (i) to (iii) of FIG. 15 may be performed. Further, in the lighting period, the light-receiving element does not detect the light emission of the LED element.

The period after the time t2 is the brightness/luminance detection period again. In the lighting period from the time t1 to the time t2, there may occur a change in the relationship between the luminance value of the light source and the driving pulse due to a temperature change. In this case, if the LED element is controlled based on the relationship between the previous luminance value and the driving pulse, the control may be performed inaccurately. Therefore, after the lighting period, the luminance value of each of the light sources is detected again, and the relationship between the luminance value of the light source and the driving pulse is calculated again.

In FIG. 17, the lighting period is provided during three synchronizing signals, and the brightness/luminance detection period is provided during one synchronizing signal that follows thereafter. However, example embodiments are not limited thereto. For example, the lighting period is provided during N synchronizing signals (N being a natural number), and the brightness/luminance detection period is provided thereafter. As described above, by periodically providing a brightness/luminance detection period after a lighting period and obtaining a relationship between the luminance value of an LED element and the driving pulse in the brightness/luminance detection period, it is possible to more accurately control the luminance value of the LED element.

Figure 18:
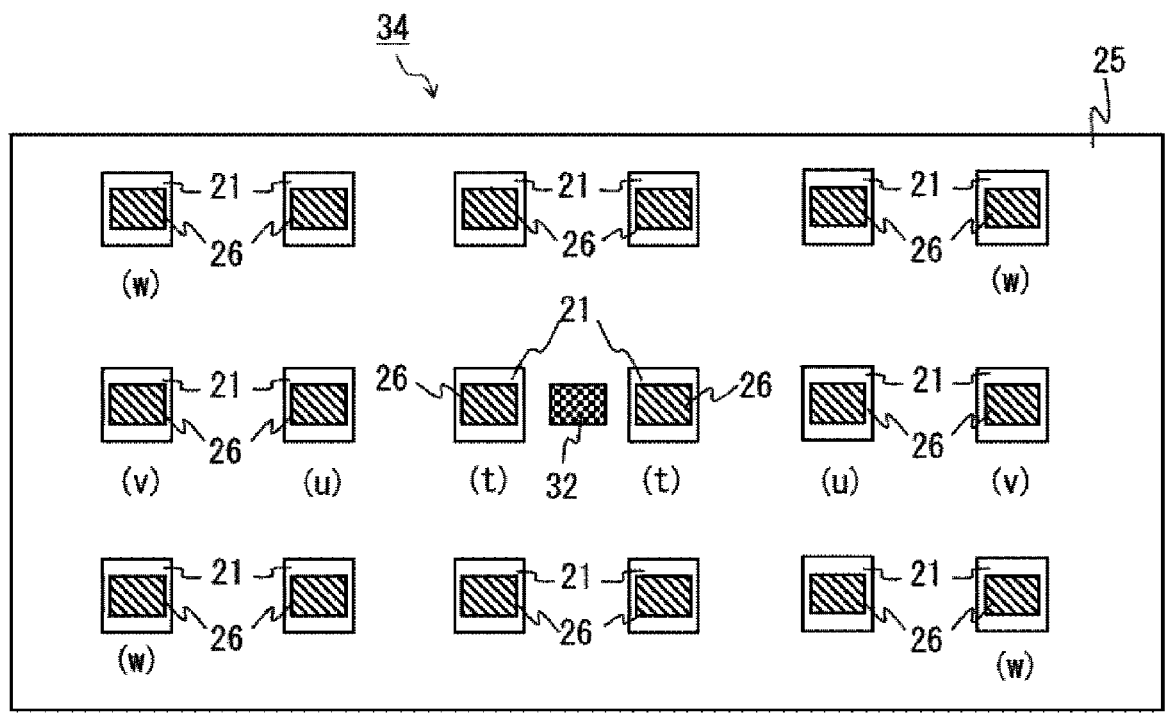
FIG. 18 illustrates an LED substrate according to an example embodiment.

FIG. 18 illustrates an LED substrate 34 according to an example embodiment. In FIG. 18, an example of arranging a single light detector 32 substantially at the center of the LED substrate 34 is illustrated. The LED substrate 34 includes a substrate body 25, a plurality of light sources 21, and the light detector 32. The plurality of light sources 21 may be LED elements. Each of the LED elements 21 includes an LED chip 26. According to the arrangement shown in FIG. 18, the plurality of LED elements 21 are arranged in the form of a square lattice, and one light detector 32 is arranged approximately at the center of the LED substrate. In this case, when the LED elements 21 shown in FIG. 13 are individually controlled to emit light such that the light emission timings of the LED elements 21 do not overlap, the light detector 32 may individually detect light pulses of all of the LED elements 21 included in the LED substrate 34. For example, the controller may control the LED elements 21 to sequentially emit light in a predetermined order such that the light emission timings of the LED elements 21 do not overlap. Further, in the brightness/luminance detection period shown in FIG. 17, the controller may individually control the LED elements 21 shown in FIG. 18 to emit light such that the light emission timings of the LED elements 21 do not overlap.

An LED element 21 farther from the light-receiving element 32 may be controlled to emit light at higher luminance. For example, in FIG. 18, an LED element 21 (t) is provided nearest to the light detector 32, and an LED element 21 (u), an LED element 21 (v), and an LED element 21 (w) are provided closer to the light detector 32 in that order. In this example, in the control of light emission, the LED element 21 (w), the LED element 21 (v), and the LED element 21 (u) may be controlled to have a higher luminance value in that order. As a result, the light detector 32 may detect the light emission of a relatively far LED element 21 and the light emission of a relatively close LED element 21 with the same accuracy.

Figure 19:
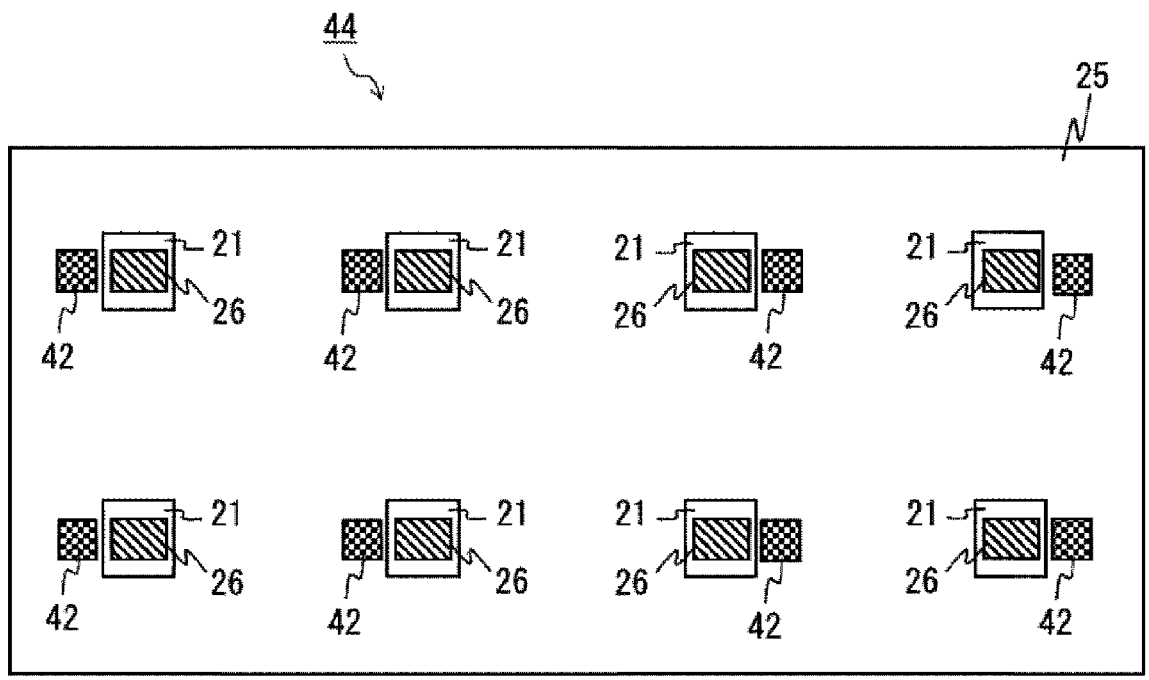
FIG. 19 illustrates an LED substrate according to an example embodiment.

FIG. 19 illustrates an LED substrate 44 according to an example embodiment. In FIG. 19, an example of arranging one light detector 42 near each light source 21 to measure the luminance of the corresponding light source 21 is illustrated. The LED substrate 44 includes a substrate body 25, a plurality of light sources 21, and a plurality of light detectors 42. The plurality of light sources 21 may be LED elements. Each of the LED elements 21 includes an LED chip 26. According to the arrangement shown in FIG. 19, the plurality of LED elements 21 are arranged in the form of a square lattice, and one light detector 42 is arranged near each LED element 21. In this arrangement example, it is assumed that the spacing between the LED elements 21 is wide, and the light emission of LED elements other than a target LED element 21 that is provided near the light detector 42 does not substantially affect the measurement of luminance of the target LED element 21 by the light detector 42.

Further, the return light from the target LED element 21 of the light detector 42 (the light incident to the light detector 42 after reflected from the surface of another component, rather than being incident directly to the light detector 42) does not substantially affect the luminance measurement by the light detector 42.

According to the arrangement shown in FIG. 19, the light emission of LED elements other than the target LED element does not affect the light detector that detects the light of the target LED element. In this case, even if the LED elements emit light at overlapping timings in the time domain, the light detector may detect the light of the target LED element without being affected by the light of the other LED elements. Thus, a series of driving pulses to be used for control of light emission of an LED element may be generated to have a substantially uniform pulse interval in the time domain. According to another example embodiment, even in the arrangement shown in FIG. 19, the LED elements 21 may be individually controlled to emit light such that the light emission timings of the LED elements 21 do not overlap, and each light detector 42 may individually detect the light of the corresponding target LED element 21.

Figure 20:
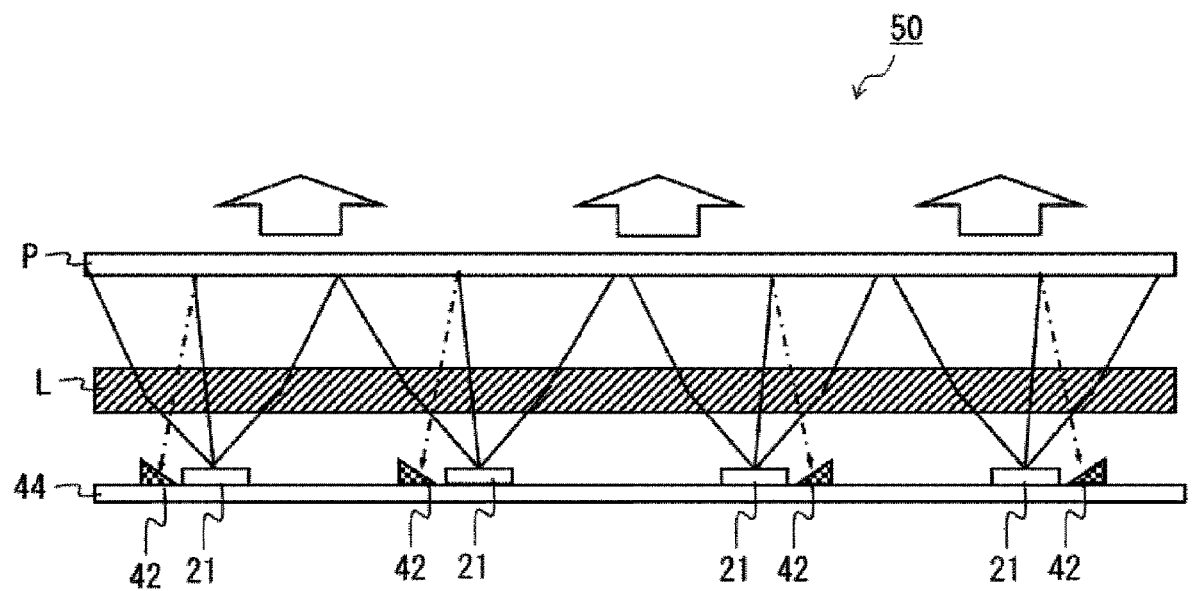
FIG. 20 is a cross-sectional view illustrating an LED display device according to an example embodiment.

FIG. 20 is a cross-sectional view illustrating an LED display device 50 according to an example embodiment. Referring to FIG. 20, the LED display device 50 includes the LED substrate 44 shown in FIG. 19. The LED display device 50 includes the LED substrate 44, a lens L, and a liquid crystal panel P. The LED display device 50 may further include a brightness enhancement film (not shown). Since the lens L and the liquid crystal panel P are the same as those described with reference to FIG. 1, the description thereof will be omitted. A light detector 42 is arranged such that a light-receiving surface thereof faces a target LED element 21. Accordingly, the light detector 42 may more strongly and directly detect the incident light from the LED element 21.

In FIG. 20, an example in which light emitted from an LED element 21 is reflected by the liquid crystal panel P and incident to (see the broken lines in FIG. 20) a light detector 42 is illustrated. However, the incident light is in a considerably low intensity compared to the light incident directly to the light detector 42 and thus, does not substantially affect the luminance measurement by the light detector 42.

In addition, correction may be performed such that a light component received by the light detector 42 other than the light incident directly from the target LED element 21 may be ignored by controlling a light emission luminance or a detected value of the above light component may be processed.

In the example embodiments of FIG. 19 and/or FIG. 20, the LED elements 21 may be controlled to have the same light emission timings. This is a difference from the previous example embodiments in which the light emission timings of the LED elements 21 need to be changed. As a result, it is possible to reduce the number of control signals for the LED elements 21 in the LED display device. Therefore, it is possible to reduce the size of a control circuit in the LED display device. Further, since the light emission of LED elements other than the target LED element 21 does not substantially affect the luminance measurement by the light detector 42, a limitation to the duty ratio during control by PWM may be removed. That is, the light emission amount during light emission may be increased compared to the previous example embodiments, and thus it becomes easy to detect and control light emission.

In the example embodiments of FIG. 19 and/or FIG. 20, all of the light emission timings of the LED elements 21 may not need to be the same. For example, in FIG. 19, the nearest LED elements 21 to the light detector 42 may be controlled to have different light emission timings, and the second nearest LED elements 21 may be controlled to have the same light emission timing.

Further, in any one of or all of the above example embodiments, it is possible to mitigate flickers by controlling the LED element 21 to emit light at random.

In the example embodiments of FIGS. 10, 11, 13, and 14, a plurality of types of driving signals, like the driving pulses (a) to (d) or the driving pulses (p) to (s), is needed. These driving signals may be used when a light detector detects the light emission of a corresponding light source. Hereinafter, an example embodiment for reducing the number of such driving signals will be described.

Figure 21:
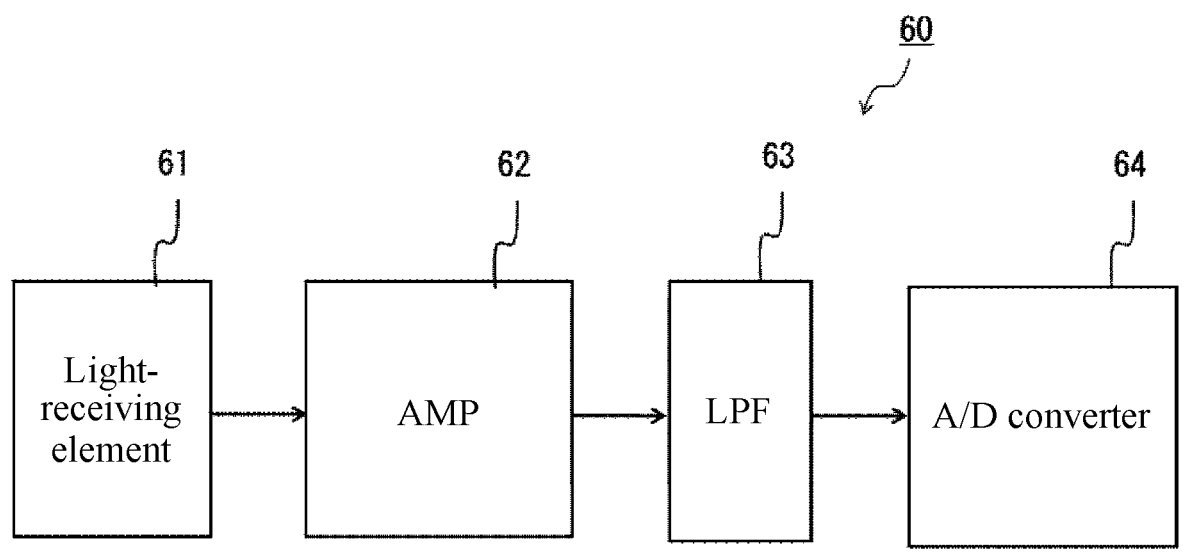
FIG. 21 is a block diagram illustrating an internal circuit of a light source device according to an example embodiment.

FIG. 21 is a block diagram illustrating an internal circuit 60 of a light source device according to an example embodiment. Referring to FIG. 21, the internal circuit 60 includes a light-receiving element 61, a current-voltage converting amplifier 62 (hereinafter, referred to as the amplifier 62), a low-pass filter (LPF) 63, and an A/D converter 64. The light-receiving element 61 may be an LED element.

The amplifier 62 converts the output current received from the light-receiving element 61 into voltage. The amplifier 62 outputs this voltage to the LPF 63. The amplifier 62 may include a circuit for changing a gain to alleviate a dynamic range that is detected by the light-receiving element 61. For example, an output terminal of the amplifier 62 and a resistor (not shown) may be connected through a switch, and the gain may be controlled by switching ON and OFF of the switch. An I/V amplifier for a typical photodiode may be used as the amplifier 62.

For example, DC lighting is performed in the area (i) of FIG. 15, wherein a first gain (A) may be used by the amplifier 62. A second gain (B) may be used for the areas (ii) and (iii) where PWM or mask control for the driving pulses is performed. The second gain (B) is a value different from the first gain (A). Available gains are not limited to these two patterns, and an additional gain pattern may be added. By increasing the gain patterns, it is possible to improve the accuracy of detecting light emission and to promote a lower resolution for A/D converters.

The I-Vamp output in each of the first gain (A) and the second gain (B) described above may be as follows.

First gain (A): $\{X_1(nit)-Y_1(mV)\}$ to $\{X_2(nit)-Y_2(mV)\}$
Second gain (B): $\{X_1(nit)-Y_1(mV)\}$ to $\{X_3(nit)-Y_3(mV)\}$ Here, $X_2 > X_1 > X_3$, and $Y_2 > Y_1 > Y_3$.

In this example, the resolution required for the A/D converter 64 may only need to identify both the ratio $X_2/X_1$ (or $Y_2/Y_1$) and the ratio $X_1/X_3$ (or $Y_1/Y_3$). If there is only one gain, the required resolution may need to identify the ratio $X_2/X_3$ (or $Y_2/Y_3$), and the resolution may need to be increased. However, if two types of gains are used, the resolution may not need to be increased. For example, the A/D converter 64 may only need to have a resolution of about 12 bits according to the values of $X_2/X_1$ and $X_1/X_3$.

The description will be continued by referring to FIG. 21 again. The LPF 63 improves the degree of reading out at the A/D converter 64 by smoothing detection results on pulses converted to the voltage by the amplifier 62 during PWM control. Further, parameters, such as the order and the cut-off frequency of the LPF 63, may be freely adjusted so as to apply to a system having a predetermined characteristic.

The A/D converter 64 may be configured by a microcontroller. The A/D converter 64 performs A/D conversion on the value output from the LPF 63. As described above, when it is possible to change the gain of the amplifier 62, the resolution for A/D conversion may not need to be high.

By the circuit configuration described above, A/D conversion is enabled without increasing the resolution even when a sampling signal to monitor the value detected by the light-receiving element is not generated. This may lead to the simplification of an internal circuit in a light source device. In addition, even when the dynamic range is expanded in a HUD, it is not needed to increase the resolution in accordance with the dynamic range.

In the above example embodiments, the light source device may further include at least one temperature sensor corresponding to one or more of the plurality of light detectors. The controller may correct detection results obtained by the light detector corresponding to the temperature sensor based on a temperature measured by the temperature sensor. The controller corrects a value detected by the light detector according to a temperature characteristic of the light detector (light-receiving element) based on the temperature measured by the temperature sensor. The detection results obtained by the light detector may be affected by the ambient temperature. Thus, by correcting the detection results obtained by the light detector, more accurate luminance may be detected. For this correction process, publicly known techniques may be appropriately used.

Further, when the temperature sensor is provided in the vicinity of the light detector, the temperature detected by the temperature sensor may be determined as the ambient temperature of the light detector. When the temperature sensor is spaced a predetermined distance apart from the light detector, a temperature obtained by performing a predetermined correction on the temperature detected by the temperature sensor may be determined as the ambient temperature.

In the example embodiments of FIGS. 2, 10, 13, 18, and 19, the plurality of light sources (LED elements) are arranged in the form of a square lattice in the light source device. However, the method of arranging the light sources is not limited thereto and may include arrangements according to a rectangular lattice other than the square lattice, or other types of polygonal lattices.

Figure 22:
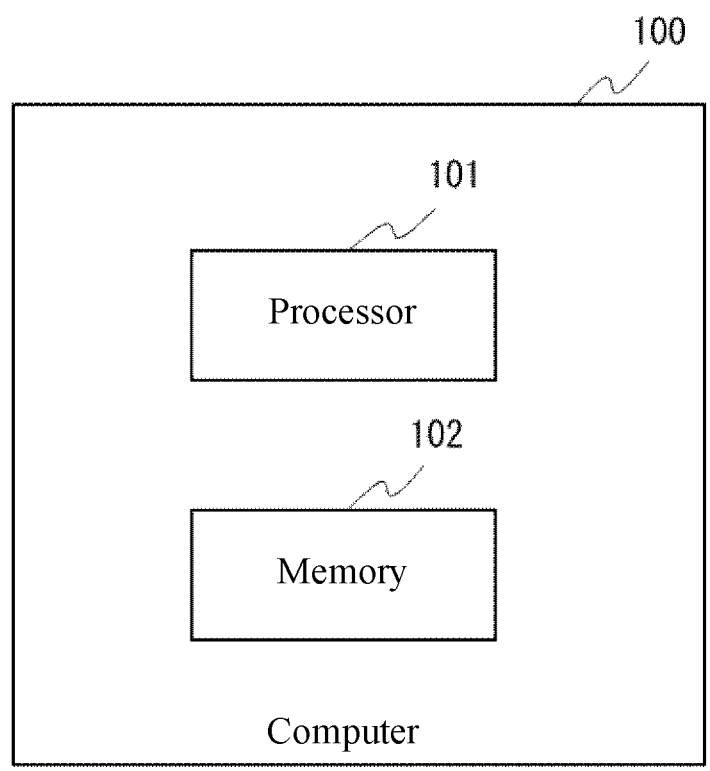
FIG. 22 is a block diagram illustrating a hardware configuration example of a computer according to an example embodiment.

Further, the processing of control of light emission for the above example embodiments may be performed by a computer (or a processor). The processing by the controller described above may be processed by the computer. For example, if a light source device is mounted on a HUD, a computer of a vehicle may perform the control processing according to the example embodiments. FIG. 22 is a block diagram illustrating a hardware configuration example of such a computer. Referring to FIG. 22, a computer 100 includes a processor 101 and a memory 102.

The processor 101 processes the control of light emission according to the example embodiments by reading out software (a computer program) from the memory 102 and executing the software. The processor 101 may include, for example, one of a central processing unit (CPU), a microprocessor (MPU), a micro-control unit (MCU), a field-programmable gate array (FPGA), a demand-side platform (DSP), and an application-specific integrated circuit (ASIC), or two or more of the above that are used in parallel.

The memory 102 is configured by a volatile memory, a non-volatile memory, or a combination thereof. The memory 102 may include a storage arranged away from the processor 101. In this case, the processor 101 may access the memory 102 through an input/output (I/O) interface that is not shown.

In FIG. 22, the memory 102 is used to store the program. The processor 101 may perform the controls according to the example embodiments by reading out the program from the memory 102 and executing the program.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular; however, one skilled in the art would appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

In expanding a dynamic range of a display device (for example, a light-emitting diode (LED) display device), there would be a difficulty if a light source emits light in a small light emission amount. Specifically, if an LED element emits light in a small light emission amount, a user recognizes flickers when viewing the LED light emission of the small light emission amount since the width of LED driving pulses is narrow and the light emission interval of the LED driving pulses is wide. According to examples of the disclosure, it is possible to mitigate flickers even in the case of a small light emission amount.

The LED display device, the light source device, the light emission control method, and the computer program stored in a non-transitory computer-readable medium according to the one or more example embodiments may control at least one of a plurality of light sources to emit light at random, thereby more mitigating flickers to be less noticeable by a user, when compared to a case in which the light sources emit light periodically.

According to one or more example embodiments, it is possible to provide an LED display device, a light source device, a light emission control method, and a computer program that may effectively mitigate flickers.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A light-emitting diode (LED) display device, comprising:
   a plurality of LED elements; and
   at least one controller configured to control the plurality of LED elements,
   wherein the at least one controller is configured to control at least one of the plurality of LED elements to emit light at random in a time domain, or configured to control the plurality of LED elements such that light emission timings of the plurality of LED elements do not overlap,
   wherein the at least one controller is further configured to, based on a first LED element emitting light in a light emission amount that is greater than zero and less than a first threshold, control to mask a portion of driving pulses of the first LED element, and
   wherein the at least one controller is further configured to, based on a second LED element emitting light in a light emission amount that is greater than or equal to the first threshold and less than a second threshold, control a light emission of the second LED by pulse width modulation (PWM).

2. The LED display device of claim 1, wherein the at least one controller is further configured to, based on at least one LED element being controlled to emit light in a light emission amount that is greater than or equal to the second threshold, control a light emission of the at least one LED element by changing a value of a current flowing in the at least one LED element.

3. The LED display device of claim 1, further comprising:
   a plurality of light detectors,
   wherein each of the plurality of light detectors is configured to detect a light emission of a corresponding one of the plurality of LED elements, and
   wherein the at least one controller is further configured to obtain, in a first period of time, a relationship between a driving pulse and a luminance value of an LED element based on a result of detection of a corresponding light detector of the plurality of light detectors, and control, in a second period of time, the LED element based on the obtained relationship.

4. A light source device, comprising:
   a plurality of light sources; and
   at least one controller configured to control the plurality of light sources,
   wherein the at least one controller is configured to control at least one of the plurality of light sources to emit light at random in a time domain, or to control the plurality of light sources such that light emission timings of the plurality of light sources do not overlap,
   wherein the at least one controller is further configured to, based on a first light source emitting light in a light emission amount that is greater than zero and less than a first threshold, control to mask a portion of driving pulses of the first light source, and wherein the at least one controller is further configured to, based on a second light source emitting light in a light emission amount that is greater than or equal to the first threshold and less than a second threshold, control a light emission of the second light source by pulse width modulation (PWM).

5. The light source device of claim 4, wherein the first threshold corresponds to a point at which a pulse width of one driving pulse is minimized such that the pulse width cannot be narrowed any further by the PWM.

6. The light source device of claim 4, wherein the at least one controller is further configured to select, at random, the portion of the driving pulses, and to control to mask the selected portion of the driving pulses.

7. The light source device of claim 4, wherein the at least one controller is further configured to generate the driving pulses of the at least one light source to have a random pulse interval in the time domain.

8. The light source device of claim 4, wherein the at least one controller is further configured to generate the driving pulses of the at least one light source to have a substantially uniform pulse interval in the time domain.

9. The light source device of claim 4, further comprising:
a plurality of light detectors,
wherein each of the plurality of light detectors is configured to detect a light emission of a corresponding one of the plurality of light sources, and
wherein the at least one controller is further configured to control a first light source based on a result of detection of a corresponding light detector of the plurality of light detectors.

10. The light source device of claim 9, wherein the at least one controller is further configured to determine a luminance value of the first light source based on a light emission peak value of the first light source detected by the corresponding light detector, a distance between the corresponding light detector and the first light source, and a light emission time of the first light source.

11. The light source device of claim 10, wherein the at least one controller is further configured to adjust the luminance value of the first light source by controlling the first light source based on the determined luminance value.

12. The light source device of claim 9, wherein the corresponding light detector of the first light source comprises a first light detector and a second light detector,
wherein a distance between the first light detector and the first light source and a distance between the second light detector and the first light source are substantially the same, and
wherein the at least one controller is further configured to calibrate a sensitivity difference between the first light detector and the second light detector based on a result of detecting a light emission of the first light source by the first light detector and a result of detecting the light emission of the first light source by the second light detector.

13. The light source device of claim 9, further comprising:
a temperature sensor configured to measure a temperature with respect to the first light source,
wherein the at least one controller is further configured to correct the result of detection of the corresponding light detector based on the temperature measured by the temperature sensor.

14. The light source device of claim 4, wherein the plurality of light sources comprises a first light source and a second light source, and
wherein the at least one controller is further configured to control a light emission timing of the second light source to be delayed by a first time behind a light emission timing of the first light source, a duration of the first time being greater than a duration of a light emission of the first light source.

* * * * *